(12) United States Patent
Shimizu et al.

(10) Patent No.: US 9,167,467 B2
(45) Date of Patent: Oct. 20, 2015

(54) RADIO BASE STATION

(71) Applicant: NTT DOCOMO, INC., Tokyo (JP)

(72) Inventors: Ryouichi Shimizu, Tokyo (JP); Kazunori Obata, Tokyo (JP); Seigo Harano, Tokyo (JP); Shogo Yabuki, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 114 days.

(21) Appl. No.: 14/123,274

(22) PCT Filed: Jan. 24, 2013

(86) PCT No.: PCT/JP2013/051418
§ 371 (c)(1),
(2) Date: Dec. 2, 2013

(87) PCT Pub. No.: WO2013/111809
PCT Pub. Date: Aug. 1, 2013

(65) Prior Publication Data
US 2014/0119310 A1    May 1, 2014

(30) Foreign Application Priority Data

Jan. 24, 2012 (JP) ................. 2012-011906

(51) Int. Cl.
*H04W 24/10* (2009.01)
*H04W 72/12* (2009.01)
(Continued)

(52) U.S. Cl.
CPC ............ *H04W 24/10* (2013.01); *H04L 5/0053* (2013.01); *H04W 72/0446* (2013.01); *H04W 72/1205* (2013.01); *H04L 5/0007* (2013.01); *H04W 52/0216* (2013.01); *H04W 74/002* (2013.01)

(58) Field of Classification Search
CPC ............ H04W 24/10; H04W 72/0446; H04W 72/1205; H04W 74/002; H04W 24/02; H04L 5/0053
See application file for complete search history.

(56) References Cited

U.S. PATENT DOCUMENTS

2010/0272004 A1* 10/2010 Maeda et al. ................. 370/312
2010/0273506 A1* 10/2010 Stern-Berkowitz et al. ......................... 455/456.1
(Continued)

FOREIGN PATENT DOCUMENTS

| EP | 2 285 158 A1 | 2/2011 |
|----|-------------|--------|
| EP | 2 296 422 A1 | 3/2011 |
| WO | 2009/157311 A1 | 12/2009 |

OTHER PUBLICATIONS

International Search Report for corresponding International Application No. PCT/JP2013/051418, mailed Mar. 12, 2013 (4 pages).
(Continued)

*Primary Examiner* — Min Jung
(74) *Attorney, Agent, or Firm* — Osha Liang LLP

(57) ABSTRACT

A radio base station determines at least any one type of subframe constituted of multiple system information subframes for sending system information to a mobile station, paging subframes for sending paging messages for the mobile station in idle mode, or on-duration subframes corresponding to on-durations at which the mobile station receives downlink control channel signals in discontinuous reception mode for the downlink control channel signals. The radio base station allocates, to the mobile station, inter-frequency measurement periods for inter-frequency measurement at the mobile station, while avoiding simultaneous occurrence of inter-frequency measurement periods and the subframes determined by the subframe determiner.

6 Claims, 13 Drawing Sheets

(51) Int. Cl.
*H04L 5/00* (2006.01)
*H04W 72/04* (2009.01)
*H04W 74/00* (2009.01)
*H04W 52/02* (2009.01)

(56) References Cited

U.S. PATENT DOCUMENTS

2013/0010964 A1* 1/2013 Fong et al. .................... 380/277
2013/0114473 A1* 5/2013 Awoniyi et al. .............. 370/280
2014/0112254 A1* 4/2014 Lindoff et al. ................ 370/328
2014/0177468 A1* 6/2014 Kazmi et al. .................. 370/254

OTHER PUBLICATIONS

Office Action for corresponding Japanese Application No. 2012-011906, mailed Mar. 5, 2013 (6 pages).
3GPP TS 36.331 V10.3.0; "3rd Generation Partnership Project; Technical Specification Group Radio Access Network; Evolved Universal Terrestrial Radio Access (E-UTRA); Radio Resource Control (RRC); Protocol specification (Release 10);" Sep. 2011 (296 pages).
3GPP TS 36.304 V10.3.0; "3rd Generation Partnership Project; Technical Specification Group Radio Access Network; Evolved Universal Terrestrial Radio Access (E-UTRA); User Equipment (UE) procedures in idle mode (Release 10);" Sep. 2011 (33 pages).
3GPP TS 36.321 V10.3.0; "3rd Generation Partnership Project; Technical Specification Group Radio Access Network; Evolved Universal Terrestrial Radio Access (E-UTRA); Medium Access Control (MAC) protocol specification (Release 10);" Sep. 2011 (54 pages).
3GPP TS 36.133 V10.4.0; "3rd Generation Partnership Project; Technical Specification Group Radio Access Network; Evolved Universal Terrestrial Radio Access (E-UTRA); Requirements for support of radio resource management (Release 10);" Sep. 2011 (464 pages).
3GPP TS 36.321 V9.6.0; "3rd Generation Partnership Project; Technical Specification Group Radio Access Network; Evolved Universal Terrestrial Radio Access (E-UTRA); Medium Access Control (MAC) protocol specification (Release 9);" Mar. 2012 (48 pages).
3GPP TS 36.331 V9.10.0; "3rd Generation Partnership Project; Technical Specification Group Radio Access Network; Evolved Universal Terrestrial Radio Access (E-UTRA); Radio Resource Control (RRC); Protocol specification (Release 9);" Mar. 2012 (255 pages).
Extended European Search Report in counterpart European Application No. 13 740 578.3 issued Aug. 24, 2015 (8 pages).
NTT DOCOMO, Inc.; "Clarifications of reception of the Paging message in RRC_CONNECTED"; 3GPP TSG-RAN2 Meeting #76; R2-115777; San Francisco, USA; Nov. 14-18, 2011 (4 pages).

* cited by examiner

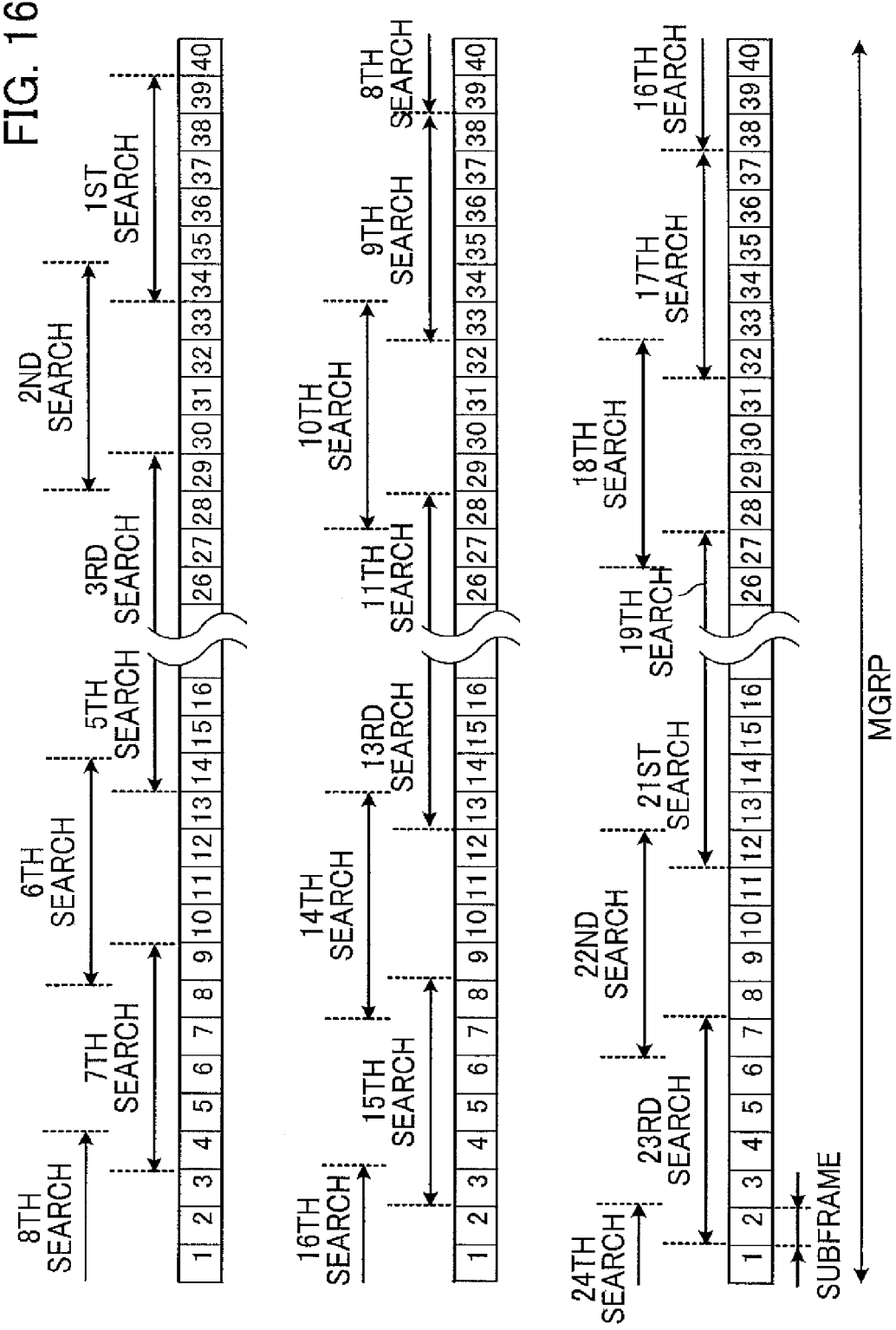

RADIO BASE STATION

FIELD OF THE INVENTION

The present invention relates to a radio base station.

BACKGROUND ART

A mobile communication system called a W-CDMA (Wideband-Code Division Multiple Access) system or a UMTS (Universal Mobile Telecommunications System) based on Code Division Multiple Access (CDMA) has been standardized and has been in widespread use in many countries including Japan and European countries. Hereinafter, W-CDMA and UMTS will be referred to as 3G. In addition, an LTE (Long Term Evolution) system has been standardized as a next generation communication system using OFDM (Orthogonal Frequency Division Multiplexing) in which communication speed is significantly enhanced compared to the 3 G communication system.

Background Art 1

In the LTE system, it is set so that a radio base station (eNB (evolved Node B)) broadcasts system information to multiple mobile stations (UEs (user equipment) as in Non-patent Document 1, Section 5.2. According to Non-patent Document 1, system information includes an MIB (Master Information Block) and multiple SIBs (System Information Blocks). MIB includes most essential and most frequently transmitted parameters for mobile stations. SIBs include System Information Block Type 1 and other SIBs (System Information Block Type 2, etc.). SIBs other than System Information Block Type 1 are grouped into some groups and included in SI (System Information) messages. Hereinafter, System Information Block Type 1 will be referred to as SIB1, and SI messages may be represented as SI-n in which n is an integer from 1 to 32.

These system information blocks and system information messages are periodically sent from the radio base station. FIGS. 1 and 2 show examples of transmission of system information transmitted from the radio base station. As shown in FIG. 1, SIB1 is sent periodically. Non-patent Document 1 stipulates that the periodicity of SIB1 is 80 ins. However, it stipulates that the same SIB1 may be repeatedly transmitted within the 80 ms periodicity, taking into consideration of failure of reception at mobile stations. In the example of FIG. 2, the retransmission cycle of SIB-1 is 20 ms. As shown in FIG. 2, the frequency band at which SIB-1 is sent is dynamically decided by dynamic scheduling As shown in FIG. 2, the MIB is also sent periodically. Non-patent Document 1 stipulates that the periodicity of MIB is 40 ms. However, it stipulates that the same MIB may be repeatedly transmitted within the 40 ms periodicity, taking into consideration of failure of reception at mobile stations. In the example of FIG. 2, the retransmission cycle of the MIB is 10 ins. As shown in FIG. 2, the frequency band at which the MIB is sent is fixed.

As shown in FIG. 1, SI messages are also transmitted periodically. More specifically, the SI messages are transmitted within periodically occurring time domain windows (referred to as SI-windows). For example, the cycle of SI-windows of SI-1 is 160 ms, the cycle of SI-windows of SI-2 is 320 ms, the cycle of SI-windows of SI-3 is 640 ms, and the cycle of SI-windows SI-4 is 1280 ins. Taking into consideration of failure of reception at mobile stations, in each SI-window, the same type of SI message may be repeatedly transmitted. For example, the leftmost SI-window in FIG. 2 is an SI-window for SI-1 in which SI-1 is repeatedly transmitted. The second left SI-window in FIG. 2 is an SI-window for SI-2 in which SI-2 is repeatedly transmitted. In FIG. 2, the SI-window for SI-1, the SI-window for SI-2, the SI-window for SI-3, and the SI-window for SI-4 are arranged consecutively, but since different types of SI messages have different cycles of SI-windows, it is not always true that these SI-windows are arranged consecutively in the next and subsequent rounds. In other words, FIG. 2 depicts the details of a period II in FIG. 1.

The length of the SI-window is configurable, but is 20 ms in the example of FIG. 2. When the transmission cycle of the MIB is 10 ms as described above, the MIB is sent twice in each SI-window. When the transmission cycle of SIB-1 is 20 ms, SIB-1 is sent once in each SI-window. The time periods (more specifically, subframes) and the frequency band at which SI messages are sent within each SI-window are dynamically decided by the radio base station using dynamic scheduling.

Background Art 2

In the 3G system and the LTE system, a radio base station (Node B in the 3G system, eNB in LTE system) periodically informs each mobile station whether or not call termination occurs. It is stipulated that mobile stations may use discontinuous reception (DRX) in idle mode for receiving paging messages (messages for imparting call termination) from the radio base station in (for example, Non-patent Document 2, Section 7).

Non-patent Document 2 concerning the LTE system stipulates that a Paging Occasion (PO) that is a subframe at which a paging message is sent and a Paging Frame (PF) that is a radio frame which may contain one or more Paging Occasions should be calculated by the equations below. The PO and the PF are calculated at both the radio base station (eNB) and the mobile station.

The system frame number (SFN) of a PF is given by the following equation:

$$\text{SFN mod } T = (T \text{ div } N)*(\text{UE\_ID mod } N)$$

where the value T is the DRX cycle of the mobile station for receiving paging messages, and is represented by the number of radio frames the number of radio frames. N is the least value of T and nB. The value nB is selected from among 4T, 2T, T, T/2, T/4, T/8, T/16, and T/32.

UE_ID is given by the following equation:

$$\text{UE\_ID} = \text{IMSI mod } 1024$$

where IMSI is the IMSI (International Mobile Subscriber Identity) of the mobile station, and each mobile station knows the IMSI of the mobile station itself. The mobile station imparts its IMSI to the MME (Mobile Management Entity) that in turn imparts the IMSI to the radio base station.

In the PF thus obtained, the subframe number of the PO is given as follows.

First, index i_s is given by the following equation:

$$i\_s = \text{floor}(\text{UE\_ID}/N) \text{mod } Ns$$

where Ns the maximum of 1 and nB/T.

Next, from Table 1 or 2, the PO corresponding to Ns and index i_s is determined. Table 1 is applied for an LTE FDD (Frequency Division Duplex) system whereas Table 2 is applied for an LTE TDD (Time Division Duplex) system. In Tables 1 and 2, N/A denotes "not applied".

TABLE 1

| Ns | PO when i_s = 0 | PO when i_s = 1 | PO when i_s = 2 | PO when i_s = 3 |
|----|-----------------|-----------------|-----------------|-----------------|
| 1  | 9               | N/A             | N/A             | N/A             |
| 2  | 4               | 9               | N/A             | N/A             |
| 4  | 0               | 4               | 5               | 9               |

TABLE 2

| Ns | PO when i_s = 0 | PO when i_s = 1 | PO when i_s = 2 | PO when i_s = 3 |
|----|-----------------|-----------------|-----------------|-----------------|
| 1  | 0               | N/A             | N/A             | N/A             |
| 2  | 0               | 5               | N/A             | N/A             |
| 4  | 0               | 1               | 5               | 6               |

In the periodical POs of the PFs thus obtained, paging messages are sent from the radio base station and are received at the mobile station.

Background Art 3

In the LTE system, for the PDCCH (Physical Downlink Control Channel, downlink control channel), discontinuous reception (DRX) is applied (Non-patent Document 3, Section 5.7). More specifically, when the radio base station and a mobile station are connected, and when there is no data to be communicated, the mobile station discontinuously receives a downlink control signal on the PDCCH. The period at which the mobile station receives the PDCCH downlink control signal is referred to as an on-duration. The mobile station activates its reception circuit for monitoring the PDCCH signal only in the on-durations, rather than always activating its reception circuit, so that power consumption can be reduced.

FIG. 3 shows an example of discontinuous reception on the PDCCH. In the on-durations, the reception circuit is activated, whereas the reception circuit is deactivated otherwise. The Long DRX Cycle is the cycle of the on-duration. The Long DRX Cycle Start Offset indicatives the commencement of the on-duration. The on-duration is specified by the Long DRX Cycle and the Long DRX Cycle Start Offset. The length of the on-duration is 1 to 200 subframes, and the Long DRX Cycle is 10 to 2560 subframes. The radio base station allocates the on-durations to mobile stations that are connected to the radio base station on the basis of parameters managed by the radio base station, and imparts the allocated on-duration to the corresponding mobile station.

Background Art 4

In the LTE system, when measurement of quality is conducted by a mobile station for a frequency band that is different from the frequency band in the serving cell, the serving base station allocates measurement gaps to the mobile station. In other words, if there is possibility that the serving base station handovers a mobile station to neighboring base station that uses a frequency band that is different from that used by the serving base station, the serving base station instructs the mobile station to activate measurement gaps in order that the mobile station can measure quality at the frequency band of the neighboring base station (i.e., in order that the mobile station is able to perform inter-frequency measurement).

In measurement gaps, the mobile station measures a quality at the frequency band used by the neighboring base station. In other words, the measurement gap is an inter-frequency measurement period for the mobile station to perform inter-frequency measurement. In the measurement gaps, the mobile station cannot receive signals from the serving base station. Accordingly, the serving base station does not transmit data to the mobile station in measurement gaps (Non-patent Document 1, Section 5.5.1 and Non-patent Document 4, Section 8.1.2.1).

FIG. 4 shows periodicity of measurement gaps. In the measurement gaps, the mobile station performs inter-frequency measurement, and it is communicable with the serving base station. The MGRP (Measurement Gap Repetition Period) is the repetition cycle of measurement gaps. The gap offset indicates the commencement of the measurement gap. The measurement gap is specified by the MGRP and the gap offset. The length of the measurement gaps is 6 ms (i.e., 6 subframes), and the length of the MGRP is 40 ms (i.e., 40 subframes) or 80 ms (i.e., 80 subframes) according to Non-patent Document 4, Section 8.1.2.1. The serving base station allocates the measurement gaps to mobile stations that are connected to the radio base station.

PRIOR ART DOCUMENTS

Non-Patent Document

Non-patent Document 1: 3GPP TS 36.331 V10.3.0 (2011-09), 3rd Generation Partnership Project; Technical Specification Group Radio Access Network; Evolved Universal Terrestrial Radio Access (E-UTRA); "Radio Resource Control (RRC)"; Protocol specification, (Release 10), September 2011

Non-patent Document 2: 3GPP TS 36.304 V10.3.0 (2011-09), 3rd Generation Partnership Project; Technical Specification Group Radio Access Network; Evolved Universal Terrestrial Radio Access (E-UTRA); "User Equipment (UE) procedures in idle mode", (Release 10), September 2011

Non-patent Document 3: 3GPP TS 36.321 V10.3.0 (2011-09), 3rd Generation Partnership Project; Technical Specification Group Radio Access Network; Evolved Universal Terrestrial Radio Access (E-UTRA); "Medium Access Control (MAC) protocol specification", (Release 10), September 2011

Non-patent Document 4: 3GPP TS 36.133 V10.4.0 (2011-09), 3rd Generation Partnership Project; Technical Specification Group Radio Access Network; Evolved Universal Terrestrial Radio Access (E-UTRA); "Requirements for support of radio resource management", (Release 10), September 2011

SUMMARY OF THE INVENTION

As described above, in the measurement gaps, the mobile station does not receive signals from the serving base station, and the serving base station does not send signals to the mobile station. However, it is likely that periods of transmission of the system information described in conjunction with Background Art 1 overlap with measurement gaps. Although system information is broadcast to many mobile stations, mobile stations do not receive the broadcast information in the measurement gaps, except for some of the mobile stations. Accordingly, system information may be missing at mobile stations.

In addition, it is likely that POs described in conjunction with Background Art 2 overlap with measurement gaps. The paging message is received by a group constituted of multiple mobile stations, but mobile stations do not receive the paging message in measurement gaps. Accordingly, there is possibility that mobile stations cannot recognize call termination.

In addition, it is likely that on-durations described in conjunction with Background Art 3 overlap with measurement gaps. In the measurement gap, all of the corresponding mobile stations do not receive the PDCCH signal and prioritize inter-frequency measurement. Accordingly, downlink control signals may be missing at mobile stations in discontinuous reception.

Accordingly, the present invention provides a radio base station that can solve at least one of the above-described problems.

A radio base station according to the present invention includes a subframe determiner adapted for determining at least any one type of subframe constituted of multiple system information subframes at which the base station sends system information to a mobile station, multiple paging subframes at which the mobile station receives paging messages in idle mode, or multiple on-duration subframes corresponding to on-durations at which the mobile station receives downlink control channel signals in discontinuous reception mode for the downlink control channel signals; and an inter-frequency-measurement-period allocator adapted for allocating, to the mobile station, inter-frequency measurement periods for inter-frequency measurement at the mobile station, in such a manner that the inter-frequency-measurement-period allocator avoids simultaneous occurrence of inter-frequency measurement periods and the subframes determined by the subframe determiner.

According to the present invention, it is possible to avoid at least one of simultaneous occurrence of periods of transmission of the system information and the inter-frequency measurement periods for inter-frequency measurement at the mobile station, simultaneous occurrence of paging occasions in idle mode of the mobile station and the inter-frequency measurement periods, and simultaneous occurrence of on-durations in discontinuous reception for the downlink control channel at the mobile station and the inter-frequency measurement periods.

The subframe determiner may be adapted for determining, as subframe numbers to be avoided, at least any one type of number constituted of relative numbers of the multiple system information subframes with respect to a length of a repetition cycle of the inter-frequency measurement periods, relative numbers of the multiple paging subframes with respect to the length of a repetition cycle of the inter-frequency measurement periods, and relative numbers of the multiple on-duration subframes with respect to the length of a repetition cycle of the inter-frequency measurement periods. In one aspect (first aspect), the inter-frequency-measurement-period allocator may be adapted for deciding whether or not any one of the subframe numbers to be avoided is included in a block having a length of the inter-frequency measurement periods, constituted of multiple consecutive subframes, and specified by subframe numbers with respect to the length of the repetition cycle of the inter-frequency measurement periods. The inter-frequency-measurement-period allocator may be adapted for selecting the block as the inter-frequency measurement period if any one of the subframe numbers to be avoided is not included in the block, and for repeating the decision to a next block shifted from the block by one subframe if any one of the subframe numbers to be avoided is included in the block.

In the first aspect, in each decision, the inter-frequency-measurement-period allocator decides whether or not any one of the subframe numbers to be avoided is included in a block that has a length of the inter-frequency measurement periods and is constituted of multiple consecutive subframes. If any one of the subframe numbers to be avoided is not included in the block, the inter-frequency-measurement-period allocator selects the block as the inter-frequency measurement period and allocates the inter-frequency measurement period to the mobile station. If any one of the subframe numbers to be avoided is included in the block, the inter-frequency-measurement-period allocator designates a next block shifted from the block by one subframe and decides whether or not any one of the subframe numbers to be avoided is included in the next block. By repeating the process by shifting the block by one subframe, a block that is appropriate as the inter-frequency measurement period can be selected most quickly in the most common cases, so that the processing load on the inter-frequency-measurement-period allocator is light.

In another aspect (second aspect), the inter-frequency-measurement-period allocator may be adapted for deciding whether or not any one of the subframe numbers to be avoided is included in a block having a length of the inter-frequency measurement periods, constituted of multiple consecutive subframes, and specified by subframe numbers with respect to the length of the repetition cycle of the inter-frequency measurement periods. The inter-frequency-measurement-period allocator may be adapted for selecting the block as the inter-frequency measurement period if any one of the subframe numbers to be avoided is not included in the block, and for repeating the decision to a next block shifted from the block by multiple subframes if any one of the subframe numbers to be avoided is included in the block.

In the second aspect, in each decision, the inter-frequency-measurement-period allocator decides whether or not any one of the subframe numbers to be avoided is included in a block that has a length of the inter-frequency measurement periods and is constituted of multiple consecutive subframes. If any one of the subframe numbers to be avoided is not included in the block, the inter-frequency-measurement-period allocator selects the block as the inter-frequency measurement period and allocates the inter-frequency measurement period to the mobile station. If any one of the subframe numbers to be avoided is included in the block, the inter-frequency-measurement-period allocator designates a next block shifted from the block by multiple subframes and decides whether or not any one of the subframe numbers to be avoided is included in the next block.

In the first aspect, if any one of the subframe numbers to be avoided is included in the block, the inter-frequency-measurement-period allocator designates a next block shifted from the block by one subframe and decides whether or not any one of the subframe numbers to be avoided is included in the next block. However, if any one of the subframe numbers to be avoided is included in the block, there is a high probability that the next block shifted from the block only by one subframe will include the subframe numbers to be avoided. Accordingly, in the first aspect, a block that is appropriate as the inter-frequency measurement period cannot be necessarily selected most quickly. On the other hand, in the second aspect, if any one of the subframe numbers to be avoided is included in the block, the inter-frequency-measurement-period allocator designates a next block shifted from the block by multiple subframes and decides whether or not any one of the subframe numbers to be avoided is included in the next block. If any one of the subframe numbers to be avoided is included in the block, there is a low probability that the next block shifted from the block by multiple subframes will include the subframe numbers to be avoided. Accordingly, it will be probable that the second aspect can select a block that is appropriate as the inter-frequency measurement period more quickly than the first aspect.

The inter-frequency-measurement-period allocator may be adapted for designate an initial block that is initially used for deciding whether or not any one of the subframe numbers to be avoided is included, in such a manner that the initial block varies depending on the mobile station to which the inter-frequency measurement periods are allocated. If the decision always begins with the same initial block, it is probable that inter-frequency measurement periods allocated to a mobile station coincide with, or partially overlap with, those allocated to another mobile station. Since resources available for downlink transmission at a ratio base station are finite, simultaneous occurrence of inter-frequency measurement periods for which the serving base station does not send data to mobile stations is not preferable. In other words, it is preferable that periods available for sending data to a mobile station be far away from periods available for sending data to another mobile station. For example, in the LTE system, if periods available for sending data to a mobile station are far away from periods available for sending data to another mobile station, there are fewer restrictions on scheduling that involves allocation of subcarriers to mobile stations. By varying the initial block that is initially used for the decision depending on the mobile station, convergence of inter-frequency measurement periods allocated to multiple mobile stations can be reduced.

The subframe determiner may be adapted for determining all of the multiple system information subframes, the multiple paging subframes, and the multiple on-duration subframes. In this case, it is possible to avoid all of simultaneous occurrence of periods of transmission of the system information and the inter-frequency measurement periods for inter-frequency measurement at the mobile station, simultaneous occurrence of paging occasions in idle mode of the mobile station and the inter-frequency measurement periods, and simultaneous occurrence of on-durations in discontinuous reception for the downlink control channel at the mobile station and the inter-frequency measurement periods.

BRIEF DESCRIPTION OF THE DRAWINGS

FIG. 16 is a diagram showing another example of a method for allocating inter-frequency measurement periods (measurement gaps) in the radio base station.

DESCRIPTION OF EMBODIMENTS

With reference to the accompanying drawings, various embodiments according to the present invention will be described hereinafter.

Figure 5:
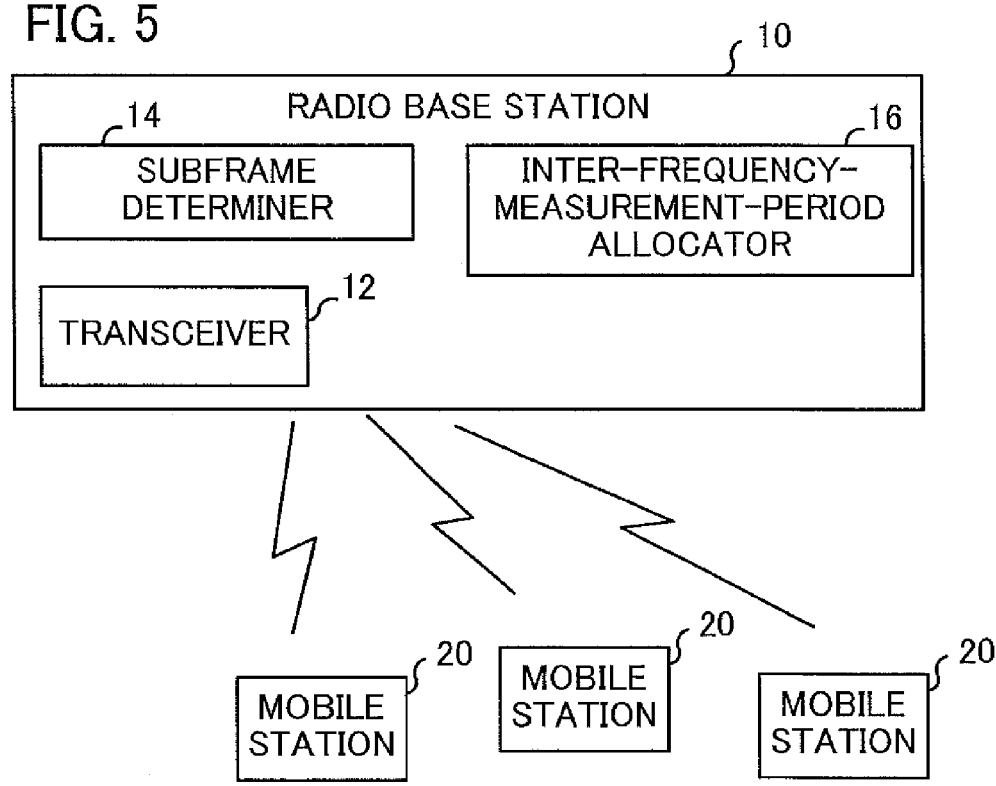
FIG. 5 is a block diagram showing a radio base station of an embodiment according to the present invention.

As shown in FIG. 5, a radio base station 10 of an embodiment according to the present invention includes a transceiver 12 that is a transmission and reception circuit for communicating wirelessly with mobile stations 20. The radio base station 10 further includes a subframe determiner 14 and an inter-frequency-measurement-period allocator 16. The subframe determiner 14 and the inter-frequency-measurement-period allocator 16 are functional blocks accomplished by the fact that a CPU (central processing unit, not shown) of the radio base station 10 executes a computer program and operates in accordance with the computer program. The communication system according to the present embodiment is an LTE system, and the radio base station 10 is an eNB, whereas each mobile station 20 is a UE.

In the present embodiment, the subframe determiner 14 of the radio base station 10 determines all of multiple system information subframes at which the base station sends system information to multiple mobile stations 20, multiple paging subframes at which the base station sends paging messages to multiple mobile stations 20 in idle mode, and multiple on-duration subframes corresponding to on-durations at which a mobile station 20 receives downlink control channel signals in discontinuous reception mode for the downlink control channel signals.

The inter-frequency-measurement-period allocator 16 of the radio base station 10 allocates, to the mobile station 20, inter-frequency measurement periods (measurement gaps described in conjunction with Background Art 4), in such a manner that the inter-frequency-measurement-period allocator 16 avoids simultaneous occurrence of inter-frequency measurement periods and the subframes determined by the subframe determiner 15. The inter-frequency measurement periods allocated to the mobile station 20 are imparted to the mobile station 20 by a signal transmitted from the transceiver 12.

According to the present embodiment, it is possible to avoid all of simultaneous occurrence of periods of transmission of the system information and the inter-frequency measurement periods (measurement gaps) for inter-frequency measurement at the mobile station 20, simultaneous occurrence of paging occasions in idle mode of the mobile station 20 and the inter-frequency measurement periods, and simultaneous occurrence of on-durations in discontinuous reception for the downlink control channel at the mobile station 20 and the inter-frequency measurement periods. Therefore, lack of system information at the mobile station can be avoided, and it is possible to avoid the situation in which the mobile station cannot recognize call termination, and furthermore, lack of downlink control signals in discontinuous reception at the mobile station can be avoided.

Determination of System Information Subframes

The subframe determiner 14 of the radio base station 10 determines multiple system information subframes at which the base station sends system information to multiple mobile stations 20, as subframes to be avoided from overlapping with measurement gaps to be allocated by the inter-frequency-measurement-period allocator 16.

Figure 2:
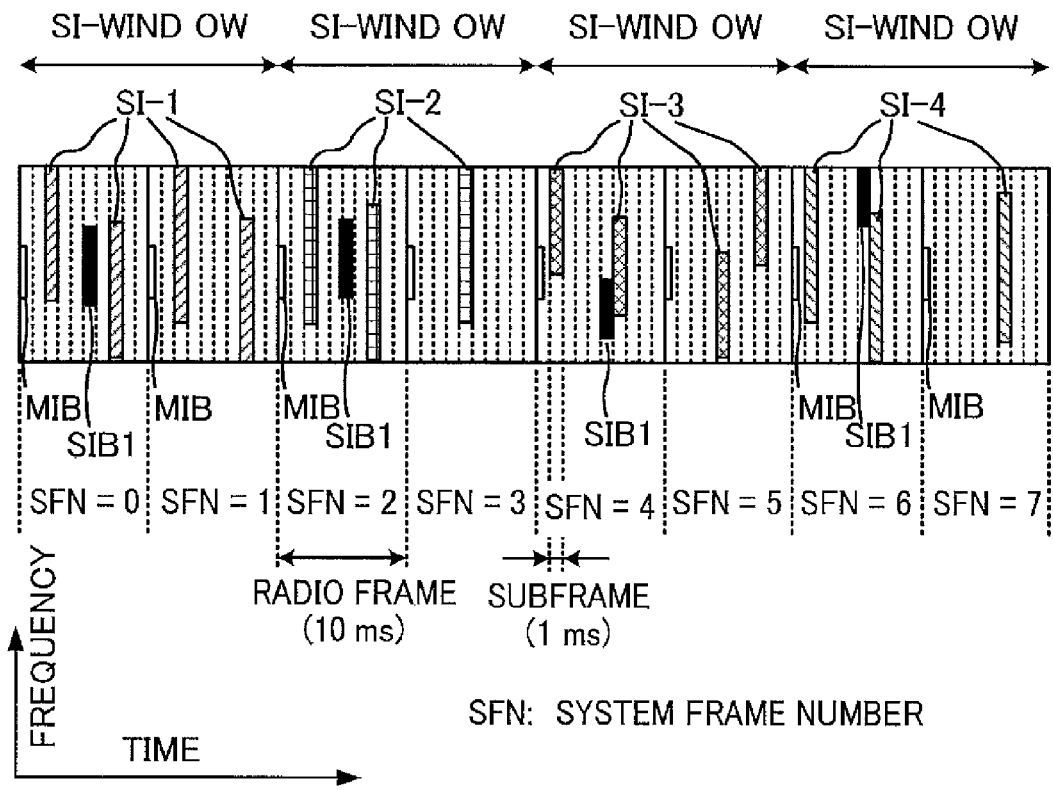
FIG. 2 is a diagram showing a more detailed example of an aspect of transmission of system information from a radio base station in the LTE system.
Figure 3:
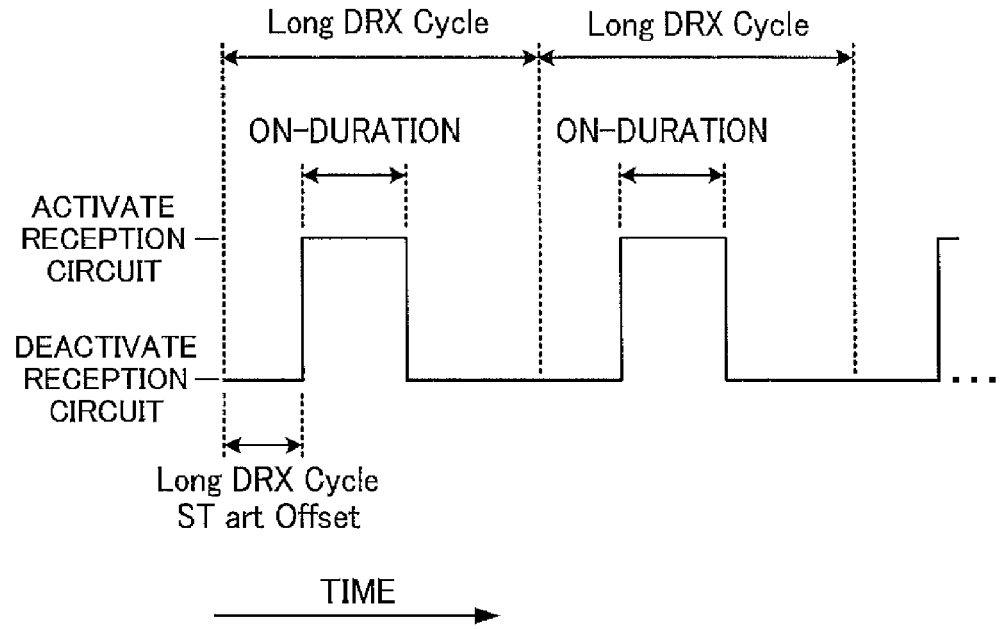
FIG. 3 is a diagram showing an example of discontinuous reception for the PDCCH in the LTE system.
Figure 4:
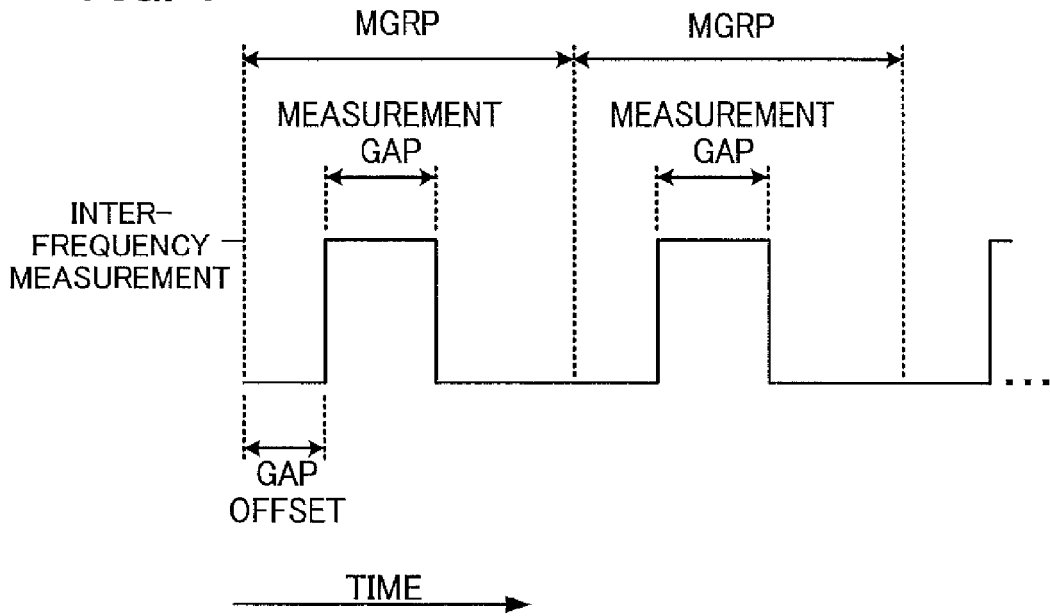
FIG. 4 is a diagram showing periodicity of measurement gaps in the LTE system.

As described above with reference to FIG. 2, SIB-1 is repeatedly transmitted at a short retransmission cycle (for example, 20 ins). Accordingly, even though a particular transmission period for SIB-1 simultaneously occurs with a measurement gap, SIB-1 can be received by the mobile station 20 at some time afterward. As described above with reference to FIG. 2, MIB is also repeatedly transmitted at a short retransmission cycle (for example, 10 ms). Accordingly, even though a particular transmission period for MIB simultaneously occurs with a measurement gap, MIB can be received by the mobile station 20 at some time afterward. However, each SI message is transmitted within SI-windows occurring at a longer cycle. Once the mobile station 20 does not receive an SI message, a long period is necessary before successful reception of the SI message. Accordingly, in the present embodiment, subframes for sending SI messages are determined as the system information subframes that should be avoided by the inter-frequency-measurement-period allocator 16.

Figure 1:
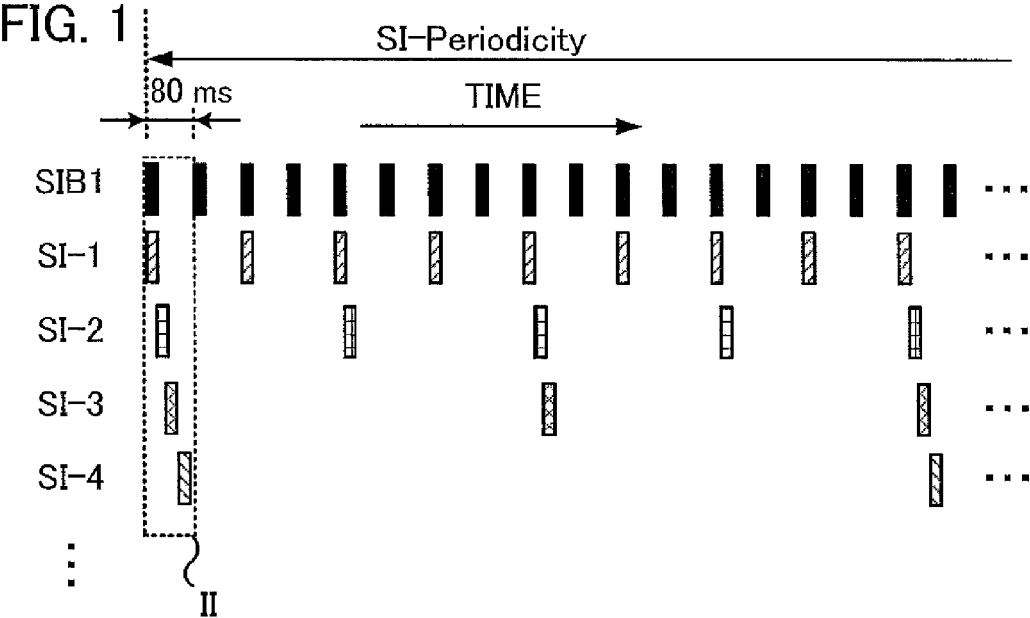
FIG. 1 is a diagram showing an example of an aspect of transmission of system information from a radio base station in the LTE system.

More specifically, the subframe determiner 14 determines individual relative numbers of the multiple system information subframes (subframes for sending SI messages) with respect to the length of the repetition cycle of the inter-frequency measurement periods (MGRP described above in conjunction with Background Art 4), as numbers ASNs of subframes to be avoided from overlapping with measurement gaps. The determination follows expression (1) below.

$$ASN=((SIN-1)*L_{SI-W}+SISN) \bmod L_{MGRP} \qquad (1)$$

where SIN is the number of an SI message. For example, SIN is 1 for SI message SI-1 in FIGS. 1 and 2, whereas SIN is 2 for SI message SI-2.

$L_{SI-W}$ is the length of SI-windows and is represented in ms (i.e., the number of subframes). The length of SI-window is variable, but in the example of FIG. 2, the length of SI-windows is 20 Ins, so that $L_{SI-W}$ is 20.

SISN is the number (ordinal number) of the subframe in which a SI message is transmitted within an SI-window. For example, within the leftmost SI-window (SI-window for SI-1) in FIG. 2, SI-1 is transmitted at the third, eighth, thirteenth, and eighteenth subframes. In this case, SISNs are 3, 8, 13, and 18.

$L_{MGRP}$ is the length of the MGRP, and is represented in ms (i.e., the number of subframes). In accordance with 3 GPP TS 36.133 V10.4.0, Section 8.1.2.1, the MGRP is 40 ins (i.e., 40 subframes) or 80 ms (i.e., 80 subframes), so that $L_{MGRP}$ is 40 or 80.

Figure 6:
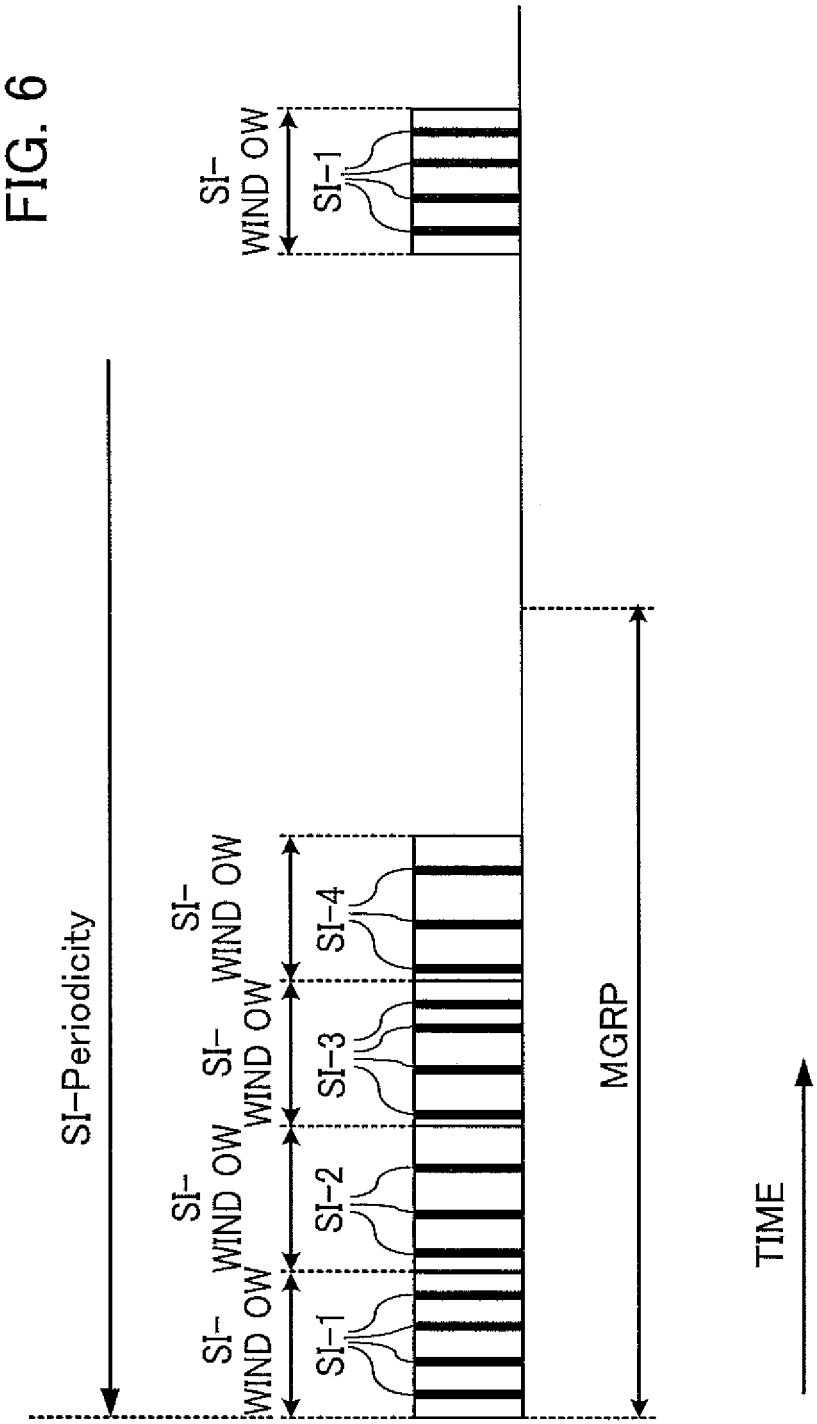
FIG. 6 is a diagram showing an example of determining system information subframes in the radio base station.
Figure 7:
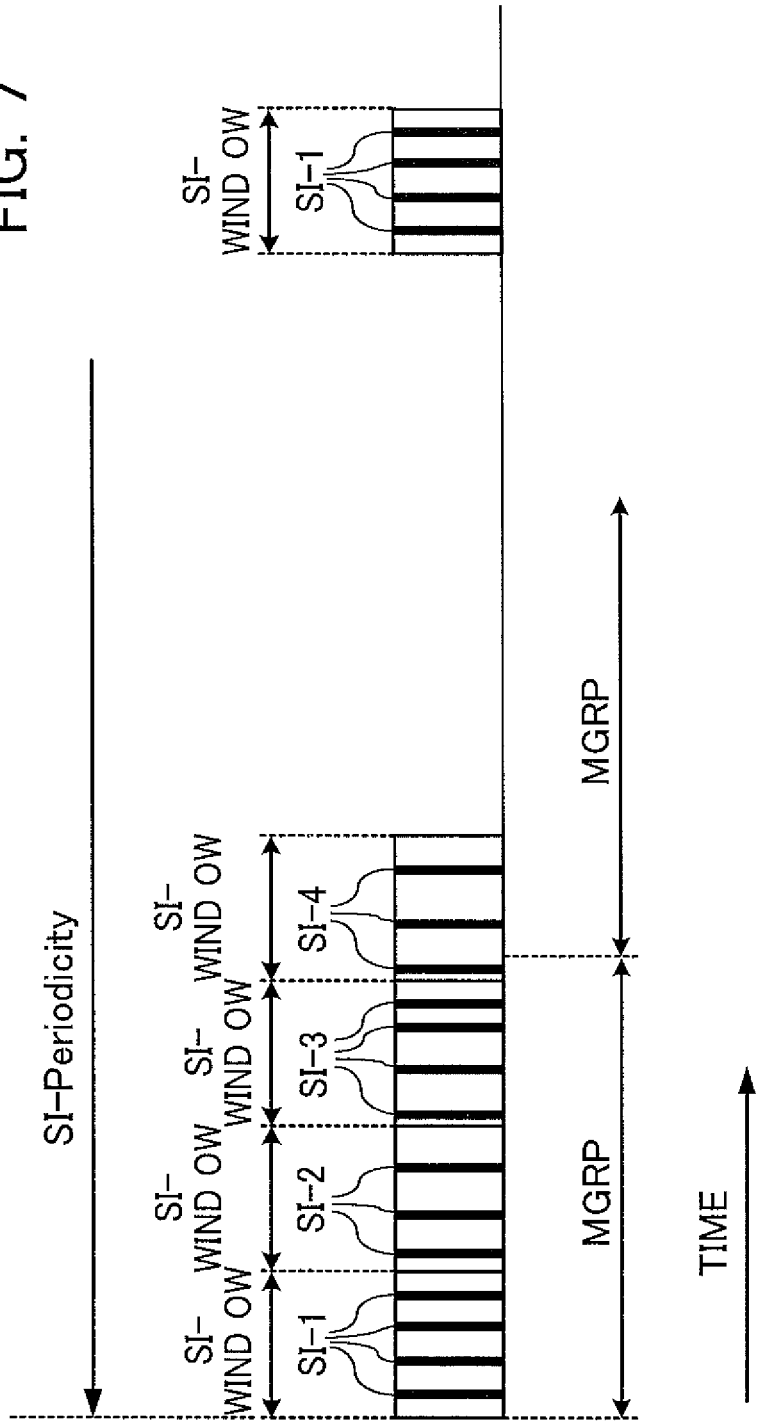
FIG. 7 is a diagram showing another example of determining system information subframes in the radio base station.

Thus, individual relative numbers ASNs of multiple system information subframes in relation to the length of the MGRP can be obtained for each SI message. For the purpose of facilitating understanding, individual relative locations on the time axis of multiple subframes for sending SI messages with respect to the length of the MGRP are shown in FIGS. 6 and 7. In FIGS. 6 and 7, the start time of the MGRP coincides with the start time of the SI-Periodicity (see 3GPP TS 36.331 V10.4.0). In FIGS. 6 and 7, system information subframes for sending SI messages SI-1, SI-2, SI-3, and SI-4 are painted with black. By virtue of expression (1), relative numbers ASNs of these system information subframes can be obtained.

By virtue of expression (1), relative numbers ASNs of the system information subframes within the initial SI-window for each SI message in the SI-Periodicity can be obtained. Since the cycle of SI-windows (160 ms, 320 ms, 640 ms, 1280 ms, . . . ) for each SI message is an integral multiple of the length of the MGRP (40 ms or 80 ms), a single MGRP cannot include multiple SI-windows for the same type of SI message. Therefore, by determining relative numbers ASNs of the system information subframes within the initial SI-window for each SI message in the SI-Periodicity, it is possible to select measurement gaps while avoiding simultaneous occurrence with system information subframes.

FIG. 6 shows a case in which the total of the lengths of initial SI-windows for respective SI messages in the SI-Periodicity is less than the MGRP. In the case of FIG. 6, expression (2) may be used instead of expression (1). Expression (2) may also be used when the total of the lengths of initial SI-windows for respective SI messages in the SI-Periodicity is equal to the MGRP.

$$ASN=((SIN-1)*L_{SI-W}+SISN) \qquad (2)$$

FIG. 7 shows a case in which the total of the lengths of initial SI-windows for respective SI messages in the SI-Periodicity is greater than the MGRP. For system information subframes within the initial MGRP in FIG. 7, expression (2) may be used, but expression (2) is inappropriate for system information subframes outside the range of the initial MGRP. However, as shown in FIG. 7, system information subframes outside the range of the initial MGRP are inside the next or subsequent MGRPs, and the relative locations of these system information subframes should be determined. Accordingly, expression (1), which is a general expression, can be used for both cases in FIGS. 6 and 7.

Determination of Paging Subframes

The subframe determiner 14 of the radio base station 10 determines multiple paging subframes for which the radio base station 10 discontinuously sends paging messages for mobile stations in idle mode, as subframes to be avoided from overlapping with measurement gaps to be allocated by the inter-frequency-measurement-period allocator 16.

As described in conjunction with Background Art 2, the radio base station 10 and the mobile station 20 calculate Paging Occasions (POs) that are subframes at which paging messages are sent, and a Paging Frame (PF) that is a radio frame that may contain one or more Paging Occasions. The PO is the paging subframe. For calculating the PFs and the PO, the IMSI should be known. Each mobile station knows the IMSI of the mobile station itself. The mobile station imparts the IMSI of the mobile station to the MME (Mobile Management Entity) by a NAS (Non-Access Stratum) signal, and the MME imparts the IMSI to the radio base station.

Figure 8:
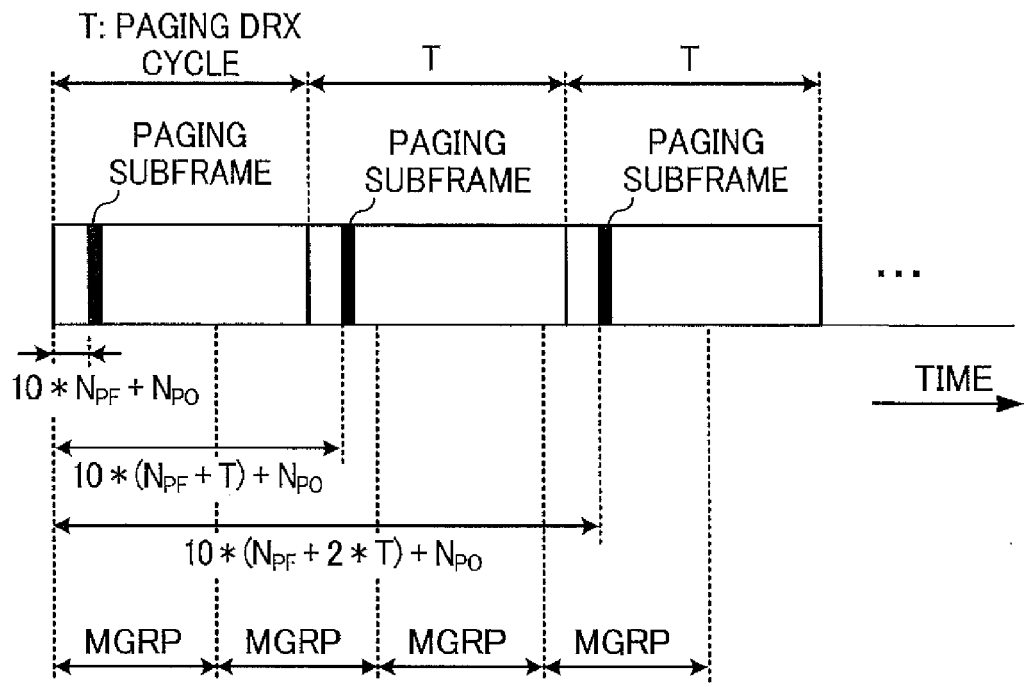
FIG. 8 is a diagram showing an example of determining paging subframes in the radio base station.

The subframe determiner 14 determines individual relative numbers of the multiple paging subframes (i.e., paging occasions, POs) with respect to the length of the repetition cycle of the inter-frequency measurement periods (MGRP), as numbers BSNs of subframes to be avoided from overlapping with measurement gaps. For the purpose of facilitating understanding, individual relative locations on the time axis of multiple subframes for sending paging messages with respect to the length of the MGRP are shown in FIG. 8.

First, the subframe determiner 14 calculates the least common multiple $LCM_1$ of the paging DRX cycle T and the length of the MGRP $L_{MGR}$. The unit of the time length of the least common multiple $LCM_1$ is ms (i.e., the number of subframes), and the paging DRX cycle T and the length of the MGRP $L_{MGRP}$ are represented in ms. As shown in FIG. 8, paging subframes (POs) outside the range of the initial MGRP are inside other subsequent MGRPs, so that the relative locations of these paging subframes on the time axis with respect to each MGRP should be determined. However, the pattern of occurrence of paging subframes on the time axis with respect to MGRPs after passing a time corresponding to the least common multiple $LCM_1$ is the same as that before passing the time. Accordingly, determination of the pattern of occurrence of paging subframes within the least common multiple $LCM_1$ is sufficient.

After calculating the least common multiple $LCM_1$, the subframe determiner 14 determines the numbers BSNs of paging subframes by expression (3) below.

$$BSN=(10*(N_{PF}+T*m)+N_{PO}) \bmod L_{MGRP} \qquad (3)$$

where $N_{PF}$ is the system frame number of a PF. The value T is the DRX cycle (paging DRX cycle) of the mobile station for receiving paging messages, and is represented in the number of radio frames. $N_{P)}$ is the subframe number of a PO. $L_{MGRP}$ is the length of the MGRP, and is represented in ins (i.e., the number of subframes). As described above, $L_{MGRP}$ is 40 or 80.

The value m is an integer within the range below, and all integers within the range are substituted into expression (3) as m. In other words, the value m denotes the range in which the relative locations of paging subframes on the time axis with respect to the MGRP should be determined.

$$m=0,1,\ldots,(LCM_1/T)-1$$

The unit of the time length of the paging DRX cycle T should be the same as the unit of the time length of the least common multiple $LCM_1$ (ms), so that T is represented in ms.

Thus, individual relative numbers BSNs of multiple paging subframes in relation to the length of the MGRP can be obtained.

Determination of on-Duration Subframes

The subframe determiner 14 of the radio base station 10 determines on-duration subframes for which the radio base station 10 discontinuously sends a downlink control signal on the PDCCH for discontinuous reception of the PDCCH signal the mobile station, as subframes to be avoided from overlapping with measurement gaps to be allocated by the inter-frequency-measurement-period allocator 16.

As described in conjunction with Background Art 3, the radio base station 10 allocates on-durations to the mobile station 20 that is being connected to the radio base station, and imparts the allocated on-duration to the mobile station 20.

Figure 9:
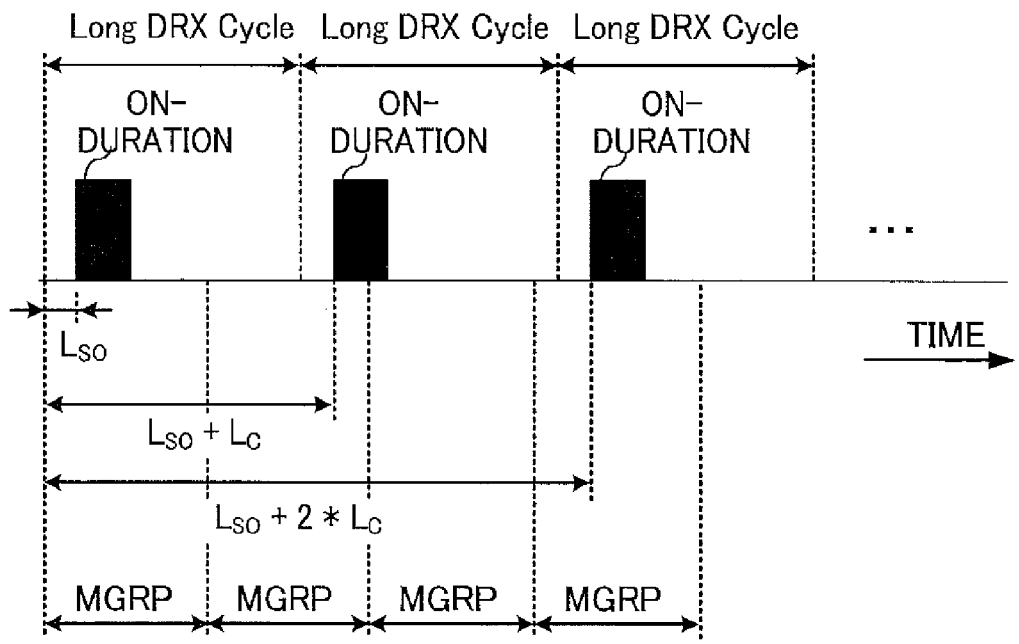
FIG. 9 is a diagram showing an example of determining on-duration subframes in the radio base station.

The subframe determiner 14 determines individual relative numbers of the multiple on-duration subframes with respect to the length of the repetition cycle of the inter-frequency measurement periods (MGRP), as numbers CSNs of subframes to be avoided from overlapping with measurement gaps. For the purpose of facilitating understanding, individual relative locations on the time axis of multiple on-duration subframes for sending the PDCCH signal with respect to the length of the MGRP are shown in FIG. 9.

First, the subframe determiner 14 calculates the least common multiple $LCM_2$ of the Long DRX Cycle T and the length of the MGRP $L_{MGR}$. The unit of the time length of the least common multiple $LCM_2$ is ins (i.e., the number of subframes), and the Long DRX Cycle T and the length of the MGRP $L_{MGRP}$ are represented in ms. As shown in FIG. 9, on-duration subframes outside the range of the initial MGRP are inside other subsequent MGRPs, so that the relative locations of these on-duration subframes on the time axis with respect to each MGRP should be determined. However, the pattern of occurrence of on-duration subframes on the time axis with respect to MGRPs after passing a time corresponding to the least common multiple $LCM_2$ is the same as that before passing the time. Accordingly, determination of the pattern of occurrence of on-duration subframes within the least common multiple $LCM_2$ is sufficient.

After calculating the least common multiple $LCM_2$, the subframe determiner 14 determines the numbers CSNs of on-duration subframe by expression (4) below.

$$CSN=(L_{SO}+L_C*p+q) \bmod L_{MGRP} \qquad (4)$$

where $L_{SO}$ is the length of the Long DRX Cycle Start Offset, and is represented in ms (i.e., the number of subframes). $L_C$ is the length of the Long DRX Cycle, and is represented in ms (i.e., the number of subframes).

The value p is an integer within the range below, and all integers within the range are substituted into expression (4) as p. In other words, the value p denotes the range in which the relative locations of on-duration subframes on the time axis with respect to the MGRP should be determined.

$$p=0,1,\ldots,(LCM_2/L_C)-1$$

The value q is an integer within the range below, and all integers within the range are substituted into expression (4) as q.

$$q=1,0,1,\ldots,L_{od}$$

The value $L_{od}$ is the value of the on Duration Timer (see 3GPP TS 36.321 V10.3.0 and 3GPP TS 36.133 V10.4.0), i.e., the length of on-durations, and is represented in the number of subframes. Consequently, the value q denotes a range from the last subframe before an on-duration and the end of the on-duration. When $L_{SO}=0$ and p=0, the expression $LCM_2-1$ is substituted into expression (4) as q.

Thus, individual relative numbers CSNs of multiple on-duration subframes in relation to the length of the MGRP can be obtained.

Embodiment for Allocating Inter-Frequency Measurement Periods

The inter-frequency-measurement-period allocator 16 of the radio base station 10 allocates inter-frequency measurement periods (measurement gaps) for the mobile station 20 to the mobile station 20, while avoiding simultaneous occurrence of inter-frequency measurement periods and the subframes determined by the subframe determiner 14. More specifically, the inter-frequency-measurement-period allocator 16 decides whether or not any one of the subframe numbers ASNs, BSNs, and CSNs to be avoided is included in a block (group) having the length of the measurement gaps and constituted of multiple consecutive subframes. If any one of the subframe numbers ASNs, BSNs, and CSNs to be avoided is not included in the block, the inter-frequency-measurement-period allocator 16 selects the block as the inter-frequency measurement period. If any one of the subframe numbers ASNs, BSNs, and CSNs to be avoided is included in the block, the inter-frequency-measurement-period allocator 16 repeats designating a next block. Hereinafter, the decision as to whether or not any one of the subframe numbers ASNs, BSNs, and CSNs is included in a block will be referred to as a "search".

Figure 10:
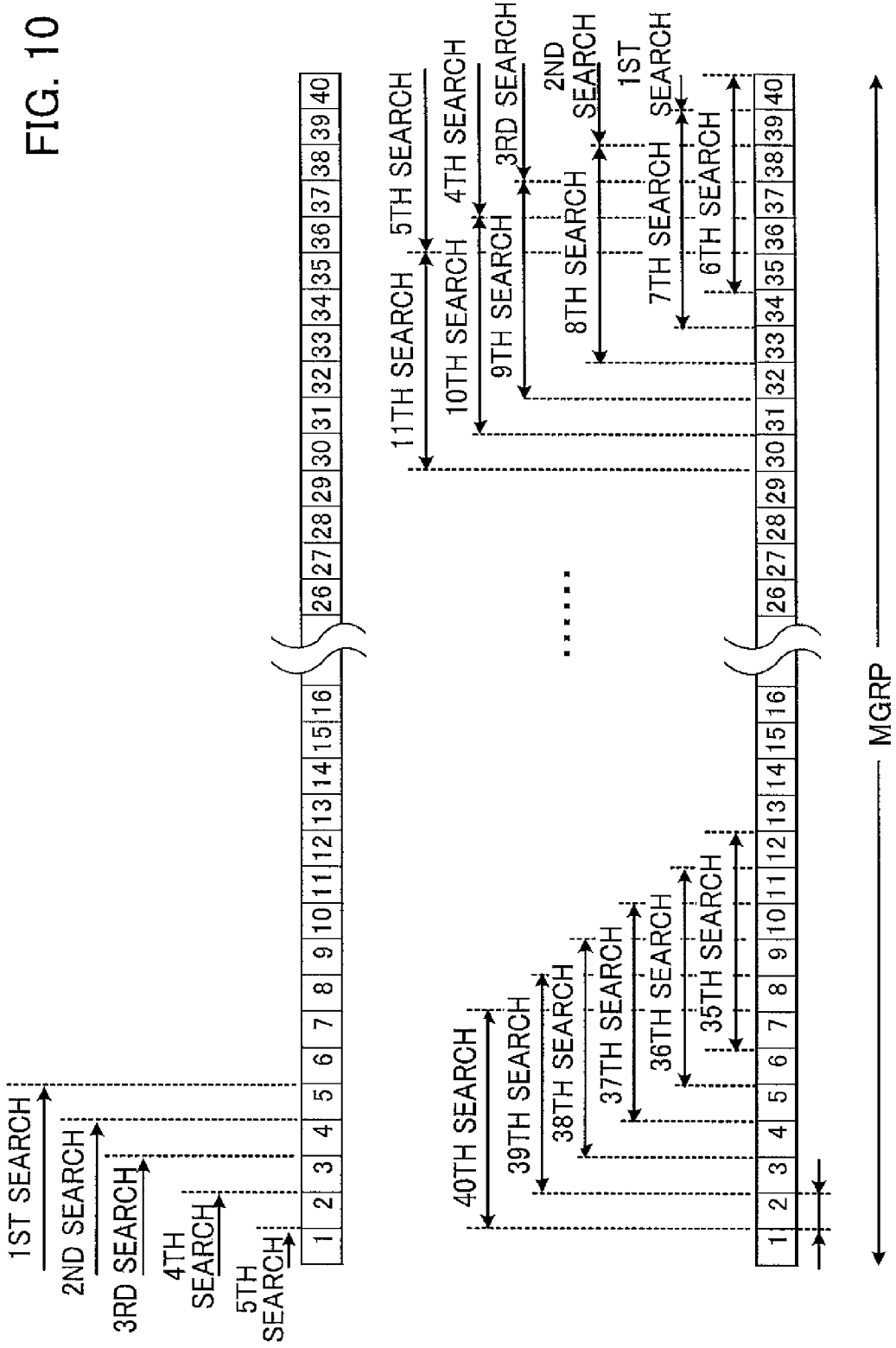
FIG. 10 is a diagram showing an example of a method for allocating inter-frequency measurement periods (measurement gaps) in the radio base station.

FIG. 10 shows an example of a method for allocating measurement gaps. In this example, the length of the MGRP, that is, the repetition cycle of inter-frequency measurement periods, is 40 ms (i.e., 40 subframes). However, the method for allocating measurement gaps described below can also be applied if the MGRP is 80 ms.

First, the inter-frequency-measurement-period allocator 16 designates a block (group) within the MGRP that should be initially subjected to the search. The block has the length of measurement gaps 6 ms (i.e., 6 subframes) and is specified by subframe numbers with respect to the length of the MGRP. Any block may be subjected to the first search. In the example of FIG. 10, let us assume that a block specified by subframe numbers 40, 1, 2, 3, 4, and 5 is specified. By selecting the beginning subframe number 40, the inter-frequency-measurement-period allocator 16 designates the block (subframe numbers 40, 1, 2, 3, 4, and 5) as the first search object.

In the first search, if any one of the numbers ASNs, BSNs, and CSNs is not included in the block, the inter-frequency-measurement-period allocator 16 selects the block as the measurement gap. More specifically, the inter-frequency-measurement-period allocator 16 selects the beginning subframe number 40 of the block as the gap offset. Thus, it is possible to select the measurement gap and to allocate it to the mobile station 20 while avoiding overlapping of the measurement gap with system information subframes, paging subframes, and on-duration subframes.

In the first search, if any one of the numbers ASNs, BSNs, and CSNs is included in the block, the inter-frequency-measurement-period allocator 16 designates a next block, i.e., the second search object. The next block is a block (subframe numbers 39, 40, 1, 2, 3, and 4) shifted from the block (subframe numbers 40, 1, 2, 3, 4, and 5) searched last by one subframe. By selecting the beginning subframe number 39 that is the beginning subframe number 40 of the last searched block minus one, the inter-frequency-measurement-period allocator 16 designates the block (subframe numbers 39, 40, 1, 2, 3, and 4) as the new search object.

In the second search, if any one of the numbers ASNs, BSNs, and CSNs is not included in the block, the inter-frequency-measurement-period allocator 16 selects the block as the measurement gap. More specifically, the inter-frequency-measurement-period allocator 16 selects the beginning subframe number 39 of the block as the gap offset.

In the second search, if any one of the numbers ASNs, BSNs, and CSNs is included in the block, the inter-frequency-measurement-period allocator 16 designates a next block, i.e., the third search object. The next block is a block (subframe numbers 38, 39, 40, 1, 2, and 3) shifted from the block (subframe numbers 39, 40, 1, 2, 3, and 4) searched last by one subframe. By selecting the beginning subframe number 38 that is the beginning subframe number 39 of the last searched block minus one, the inter-frequency-measurement-period allocator 16 designates the block (subframe numbers 38, 39, 40, 1, 2, and 3) as the new search object.

In the third search, if any one of the numbers ASNs, BSNs, and CSNs is not included in the block, the inter-frequency-measurement-period allocator 16 selects the block as the measurement gap. More specifically, the inter-frequency-measurement-period allocator 16 selects the beginning subframe number 38 of the block as the gap offset.

In the third search, if any one of the numbers ASNs, BSNs, and CSNs is included in the block, the inter-frequency-measurement-period allocator 16 designates a next block, i.e., the fourth search object. The next block is a block (subframe numbers 37, 38, 39, 40, 1, and 2) shifted from the block (subframe numbers 38, 39, 40, 1, 2, and 3) searched last by one subframe. By selecting the beginning subframe number 37 that is the beginning subframe number 38 of the last searched block minus one, the inter-frequency-measurement-period allocator 16 designates the block (subframe numbers 37, 38, 39, 40, 1, and 2) as the new search object.

In the fourth search, if any one of the numbers ASNs, BSNs, and CSNs is not included in the block, the inter-frequency-measurement-period allocator 16 selects the block as the measurement gap. More specifically, the inter-frequency-measurement-period allocator 16 selects the beginning subframe number 37 of the block as the gap offset. Afterward, if a block that does not include any one of the numbers ASNs, BSNs, and CSNs is found, the block is selected as the measurement gap. Otherwise, shift to a next block that is different from the last searched block by one subframe is repeated. At most 40 searches can be conducted, in which 40 is the number of subframes included in the MGRP.

In the first embodiment described with reference to FIG. 10, the inter-frequency-measurement-period allocator 16 decides whether or not any one of the subframe numbers ASNs, BSNs, and CSNs to be avoided is included in a block that has a length of the measurement gaps and is constituted of multiple consecutive subframes. If any one of the subframe numbers ASNs, BSNs, and CSNs to be avoided is not included in the block, the inter-frequency-measurement-period allocator 16 selects the block as the measurement gap and allocates the measurement gap to the mobile station. If any one of the subframe numbers ASNs, BSNs, and CSNs to be avoided is included in the block, the inter-frequency-measurement-period allocator 16 designates a next block shifted from the block by one subframe and decides whether or not any one of the subframe numbers ASNs, BSNs, and CSNs to be avoided is included in the next block. By repeating the process while shifting the block by one subframe, a block that is appropriate as the measurement gap can be selected most quickly in common cases, so that the processing load on the inter-frequency-measurement-period allocator 16 is light.

Another Embodiment for Allocating Inter-Frequency Measurement Periods

Figure 11:
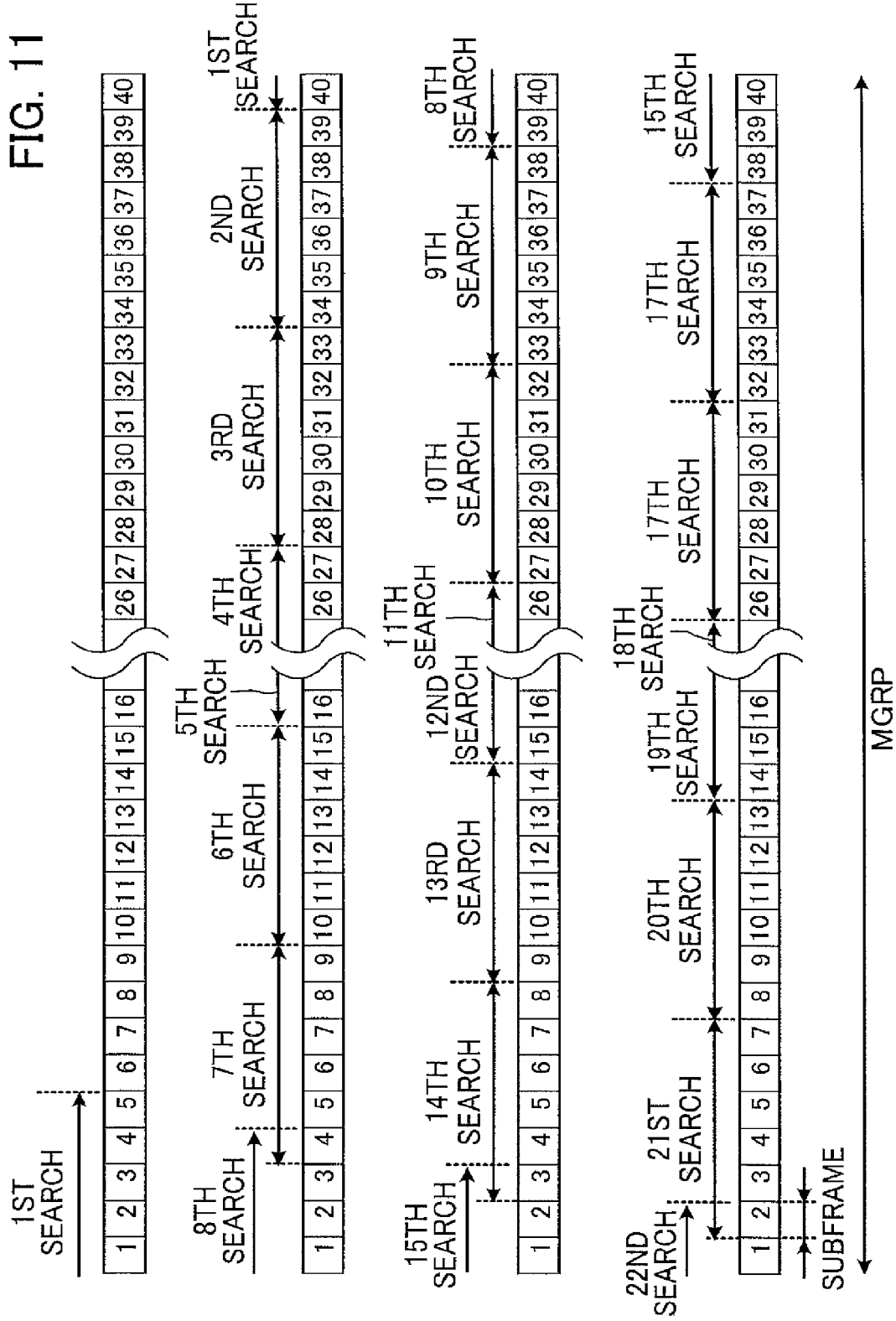
FIG. 11 is a diagram showing another example of a method for allocating inter-frequency measurement periods (measurement gaps) in the radio base station.
Figure 12:
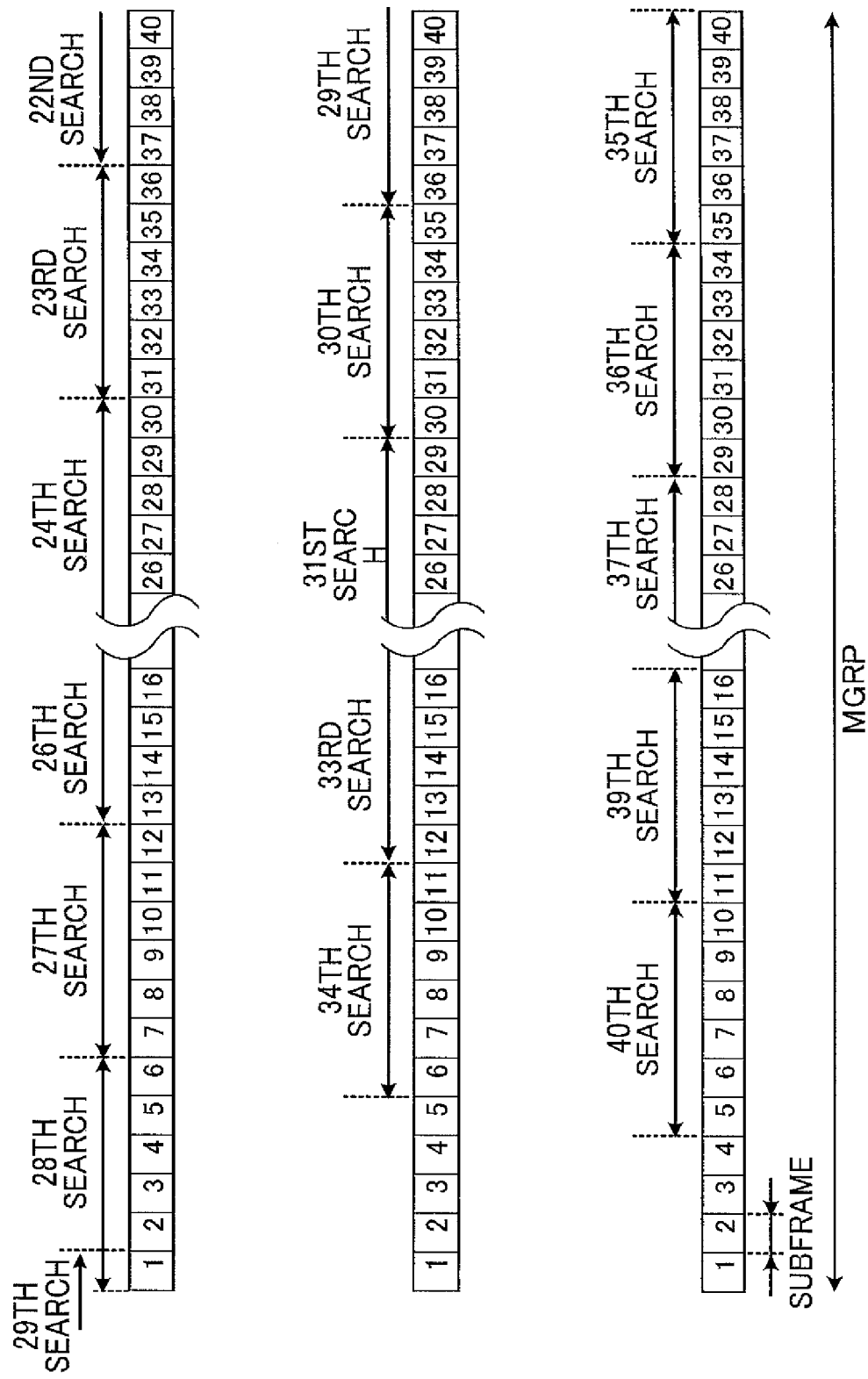
FIG. 12 is a continuation of FIG. 11.

FIGS. 11 and 12 show another example of a method for allocating measurement gaps. In this example, the length of the MGRP, that is, the repetition cycle of inter-frequency measurement periods is 40 Ins (i.e., 40 subframes). However, the method for allocating measurement gaps described below can also be applied if the MGRP is 80 ms.

First, the inter-frequency-measurement-period allocator 16 designates a block (group) within the MGRP that should be initially subjected to the search. The block has the length of measurement gaps 6 ms (i.e., 6 subframes) and is specified by subframe numbers with respect to the length of the MGRP. Any block may be subjected to the first search. In the example of FIG. 11, let us assume that a block specified by subframe numbers 40, 1, 2, 3, 4, and 5 is specified. By selecting the beginning subframe number 40, the inter-frequency-measurement-period allocator 16 designates the block (subframe numbers 40, 1, 2, 3, 4, and 5) as the first search object.

In the first search, if any one of the numbers ASNs, BSNs, and CSNs is not included in the block, the inter-frequency-measurement-period allocator 16 selects the block as the measurement gap. More specifically, the inter-frequency-measurement-period allocator 16 selects the beginning subframe number 40 of the block as the gap offset. Thus, it is possible to select the measurement gap and to allocate it to the mobile station 20 while avoiding overlapping of the measurement gap with system information subframes, paging subframes, and on-duration subframes.

In the first search, if any one of the numbers ASNs, BSNs, and CSNs is included in the block, the inter-frequency-measurement-period allocator 16 designates a next block, i.e., the second search object. The next block is a block (subframe numbers 34, 35, 36, 37, 38, and 39) shifted from the block (subframe numbers 40, 1, 2, 3, 4, and 5) searched last by one block. By selecting the beginning subframe number 34 that is the beginning subframe number 40 of the last searched block minus six, the inter-frequency-measurement-period allocator 16 designates the block (subframe numbers 34, 35, 36, 37, 38, and 39) as the new search object.

In the second search, if any one of the numbers ASNs, BSNs, and CSNs is not included in the block, the interfrequency-measurement-period allocator 16 selects the block as the measurement gap. More specifically, the inter-frequency-measurement-period allocator 16 selects the beginning subframe number 34 of the block as the gap offset.

In the second search, if any one of the numbers ASNs, BSNs, and CSNs is included in the block, the inter-frequency-measurement-period allocator 16 designates a next block, i.e., the third search object. The next block is a block (subframe numbers 28, 29, 30, 31, 32, and 33) shifted from the block (subframe numbers 34, 35, 36, 37, 38, and 39) searched last by one block. By selecting the beginning subframe number 28 that is the beginning subframe number 34 of the last searched block minus six, the inter-frequency-measurement-period allocator 16 designates the block (subframe numbers 28, 29, 30, 31, 32, and 33) as the new search object.

In the third search, if any one of the numbers ASNs, BSNs, and CSNs is not included in the block, the inter-frequency-measurement-period allocator 16 selects the block as the measurement gap. More specifically, the inter-frequency-measurement-period allocator 16 selects the beginning subframe number 28 of the block as the gap offset.

In the third search, if any one of the numbers ASNs, BSNs, and CSNs is included in the block, the inter-frequency-measurement-period allocator 16 designates a next block, i.e., the fourth search object. The next block is a block (subframe numbers 22, 23, 24, 25, 26, and 27) shifted from the block (subframe numbers 28, 29, 30, 31, 32, and 33) searched last by one block. By selecting the beginning subframe number 22 that is the beginning subframe number 28 of the last searched block minus six, the inter-frequency-measurement-period allocator 16 designates the block (subframe numbers 22, 23, 24, 25, 26, and 27) as the new search object.

In the fourth search, if any one of the numbers ASNs, BSNs, and CSNs is not included in the block, the inter-frequency-measurement-period allocator 16 selects the block as the measurement gap. More specifically, the inter-frequency-measurement-period allocator 16 selects the beginning subframe number 22 of the block as the gap offset. Thus, if a block that does not include any one of the numbers ASNs, BSNs, and CSNs is found, the block is selected as the measurement gap. Otherwise, shift to a next block that is different from the last searched block by the length of one block is repeated.

In the seventh search for the block (subframe numbers 4, 5, 6, 7, 8, and 9) in which the beginning subframe number is less than 6, if any one of the numbers ASNs, BSNs, and CSNs is included in the block, the inter-frequency-measurement-period allocator 16 designates a next block, i.e., the eighth search object. In this case, the next block is a block (subframe numbers 39, 40, 1, 2, 3, and 4) shifted from the last searched block (subframe numbers 4, 5, 6, 7, 8, and 9) by five subframes (not by the length of the block).

The block (subframe numbers 39, 40, 1, 2, 3, and 4) that is the eighth search object partially overlaps with the block (subframe numbers 40, 1, 2, 3, 4, and 5) that is the first search object. However, even through the block of the first search object does not include any one of the numbers ASNs, BSNs, and CSNs, it is not so limited that the block of the eighth search object does not include any one of the numbers ASNs, BSNs, and CSNs, so that the eighth search is conducted.

Afterward, if a block that does not include any one of the numbers ASNs, BSNs, and CSNs is found, the block is selected as the measurement gap. Otherwise, shift to a next block that is different from the last searched block by the length of one block is repeated. The eighth to the fourteenth search objects are different from the first to the seventh search objects by one subframe, respectively.

In the fourteenth search for the block (subframe numbers 3, 4, 5, 6, 7, and 8) in which the beginning subframe number is less than 6, if any one of the numbers ASNs, BSNs, and CSNs is included in the block, the inter-frequency-measurement-period allocator 16 designates a next block, i.e., the fifteenth search object. In this case, the next block is a block (subframe numbers 38, 39, 40, 1, 2, and 3) shifted from the last searched block (subframe numbers 3, 4, 5, 6, 7, and 8) by five subframes (not by the length of the block).

Afterward, if a block that does not include any one of the numbers ASNs, BSNs, and CSNs is found, the block is selected as the measurement gap. Otherwise, shift to a next block that is different from the last searched block by the length of one block is repeated. The fifteenth to the twenty-first search objects are different from the eighth to the fourteenth search objects by one subframe, respectively.

In the twenty-first search for the block block (subframe numbers 2, 3, 4, 5, 6, and 7) in which the beginning subframe number is less than 6, if any one of the numbers ASNs, BSNs, and CSNs is included in the block, the inter-frequency-measurement-period allocator 16 designates a next block, i.e., the twenty-second search object. As shown in FIGS. 11 and 12, the next block is a block (subframe numbers 37, 38, 39, 40, 1, and 2) shifted from the last searched block (subframe numbers 2, 3, 4, 5, 6, and 7) by five subframes (not by the length of the block).

Afterward, if a block that does not include any one of the numbers ASNs, BSNs, and CSNs is found, the block is selected as the measurement gap. Otherwise, shift to a next block that is different from the last searched block by the length of one block is repeated. The twenty-second to the twenty-eighth search objects are different from the fifteenth to the twenty-first search objects by one subframe, respectively.

In the twenty-eighth search for the block (subframe numbers 1, 2, 3, 4, 5, and 6) in which the beginning subframe number is less than 6, if any one of the numbers ASNs, BSNs, and CSNs is included in the block, the inter-frequency-measurement-period allocator 16 designates a next block, i.e., the twenty-ninth search object. As shown in FIG. 12, the next block is a block (subframe numbers 36, 37, 38, 39, 40, and 1) shifted from the last searched block (subframe numbers 1, 2, 3, 4, 5, and 6) by five subframes (not by the length of the block).

Afterward, if a block that does not include any one of the numbers ASNs, BSNs, and CSNs is found, the block is selected as the measurement gap. Otherwise, shift to a next block that is different from the last searched block by the length of one block is repeated. The twenty-ninth to the thirty-fourth search objects are different from the twenty-second to the twenty-seventh search objects by one subframe, respectively.

In the thirty-fourth search search for the block block (subframe numbers 6, 7, 8, 9, 10, and 11) in which the beginning subframe number is less than 6, if any one of the numbers ASNs, BSNs, and CSNs is included in the block, the inter-frequency-measurement-period allocator 16 designates a next block, i.e., the thirty-fifth search object. As shown in FIG. 12, the next block is a block (subframe numbers 35, 36, 37, 38, 39, and 40) shifted from the last searched block (subframe numbers 6, 7, 8, 9, 10, and 11) by eleven subframes (not by the length of the block).

Afterward, if a block that does not include any one of the numbers ASNs, BSNs, and CSNs is found, the block is selected as the measurement gap. Otherwise, shift to a next block that is different from the last searched block by the length of one block is repeated. The twenty-second to the twenty-eighth search objects are different from the fifteenth to the twenty-first search objects by one subframe, respectively. At most 40 searches can be conducted, in which 40 is the number of subframes included in the MGRP. The thirty-fifth to the fortieth search objects are different from the twenty-ninth to the thirty-fourth search objects by one subframe, respectively.

In the second embodiment described with reference to FIGS. 11 and 12, in each decision, the inter-frequency-measurement-period allocator 16 decides whether or not any one of the subframe numbers ASNs, BSNs, and CSNs to be avoided is included in a block that has the length of the measurement gaps and is constituted of multiple consecutive subframes. If any one of the subframe numbers ASNs, BSNs, and CSNs to be avoided is not included in the block, the inter-frequency-measurement-period allocator 16 selects the block as the measurement gap and allocates the measurement gap to the mobile station. If any one of the subframe numbers ASNs, BSNs, and CSNs to be avoided is included in the block, the inter-frequency-measurement-period allocator 16 designates a next block shifted from the block by the length of six subframes (the length of the block, i.e., the length of the measurement gap) or the length of five subframes, and decides whether or not any one of the subframe numbers ASNs, BSNs, and CSNs to be avoided is included in the next block.

In the first embodiment described with reference to FIG. 10, if any one of the subframe numbers ASNs, BSNs, and CSNs to be avoided is included in the block, the inter-frequency-measurement-period allocator 16 designates a neighboring block shifted from the block by one subframe and decides whether or not any one of the subframe numbers ASNs, BSNs, and CSNs to be avoided is included in the next block. However, if any one of the subframe numbers to be avoided is included in the block, there is a high probability that the next block shifted from the block only by one subframe will include the subframe numbers to be avoided. Accordingly, in the first embodiment, a block that is appropriate as the measurement gap cannot be necessarily selected most quickly. On the other hand, in the second embodiment described with reference to FIGS. 11 and 12, if any one of the subframe numbers to be avoided is included in the block, the inter-frequency-measurement-period allocator 16 designates a next block shifted from the block by multiple subframes and decides whether or not any one of the subframe numbers to be avoided is included in the next block. If any one of the subframe numbers to be avoided is included in the block, there is a low probability that the next block shifted from the block by multiple subframes will include the subframe numbers to be avoided. Accordingly, there will be a probability that the second embodiment can select a block that is appropriate as the measurement gap quicker that the first embodiment.

Another Embodiment for Allocating Inter-Frequency Measurement Periods

Figure 13:
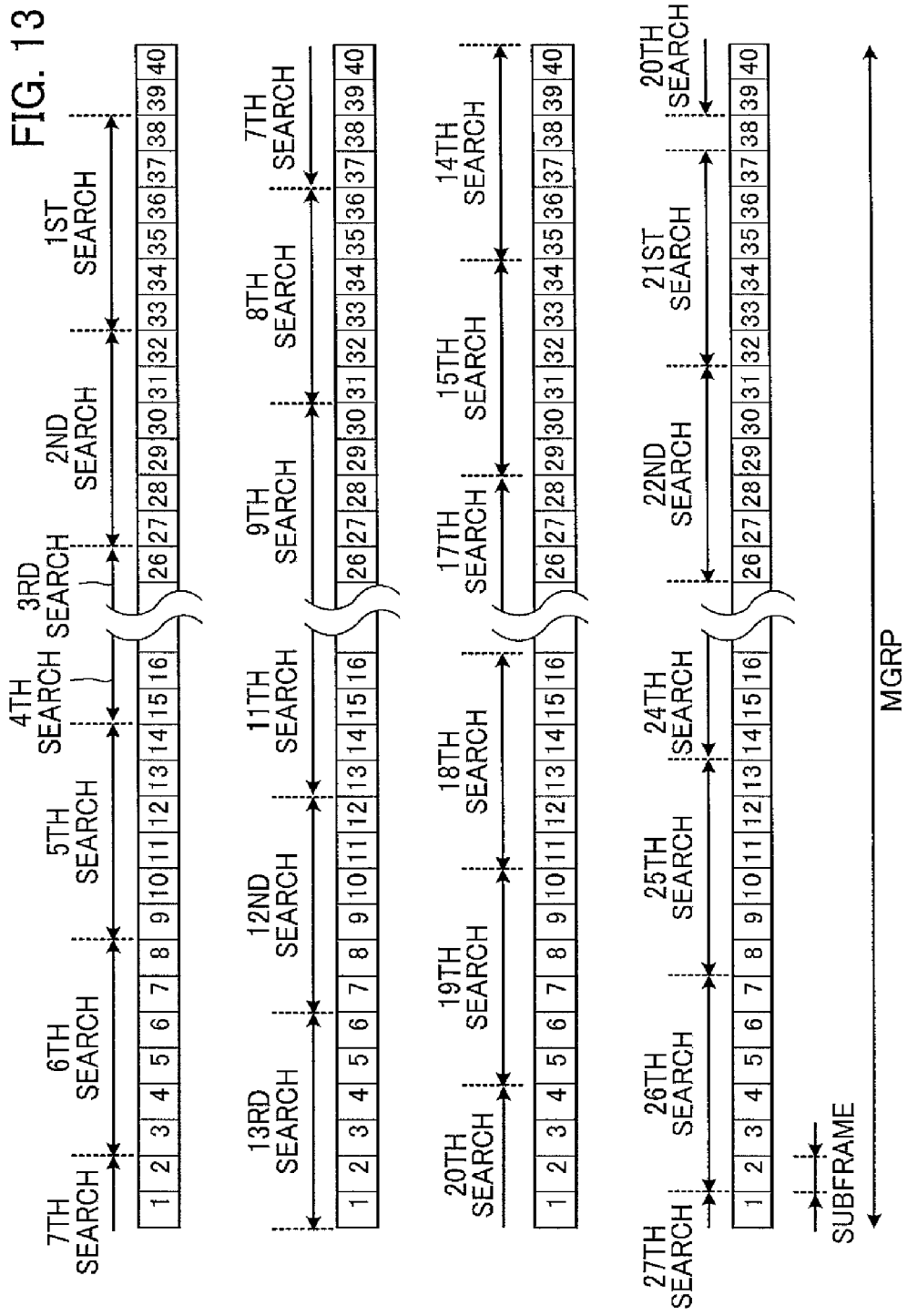
FIG. 13 is a diagram showing another example of a method for allocating inter-frequency measurement periods (measurement gaps) in the radio base station.
Figure 14:
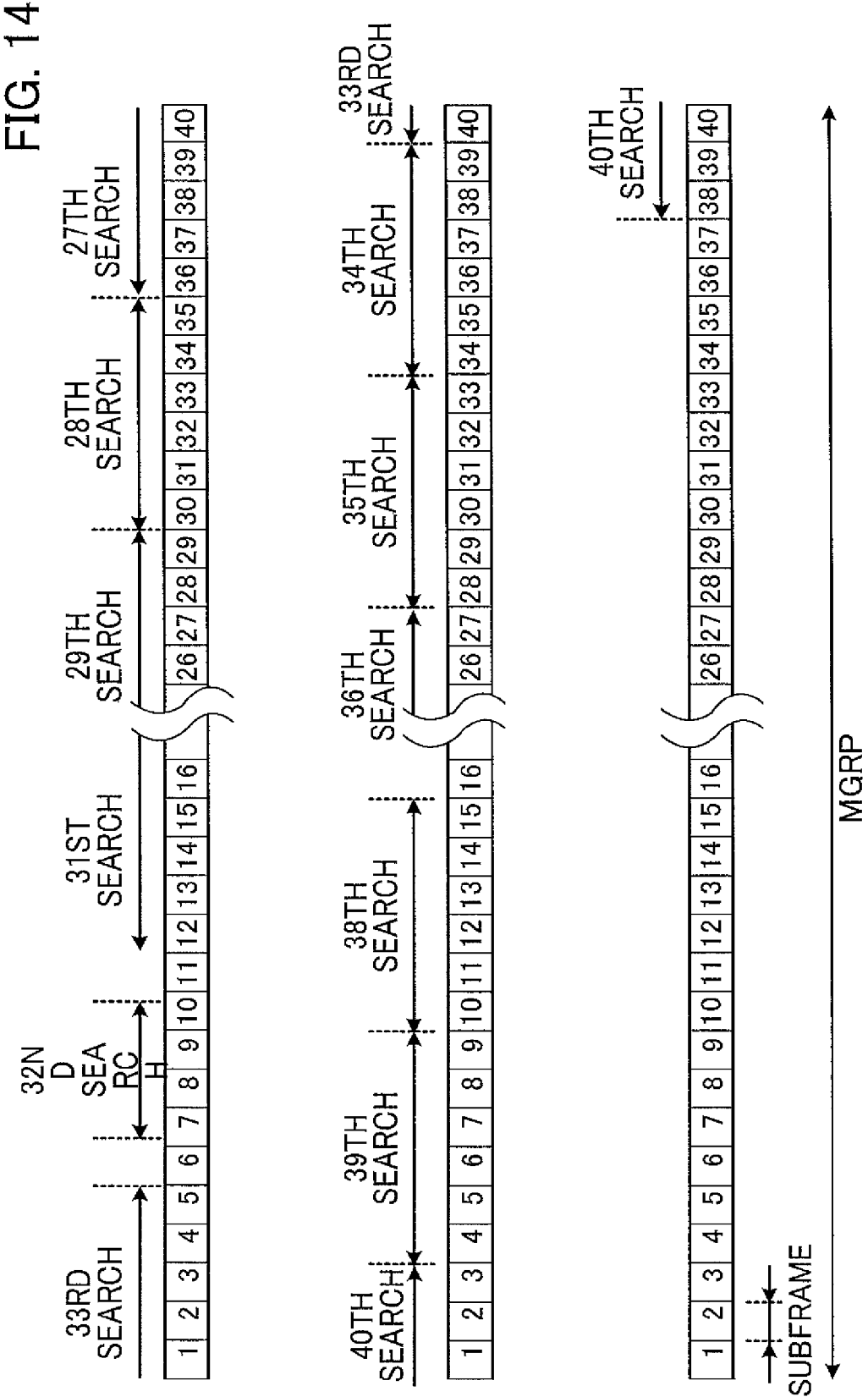
FIG. 14 is a continuation of FIG. 13.

FIGS. 13 and 14 show another example of a method for allocating measurement gaps. In this example, the length of the MGRP, that is, the repetition cycle of inter-frequency measurement periods is 40 ms (i.e., 40 subframes). However, the method for allocating measurement gaps described below can also be applied if the MGRP is 80 ms.

First, the inter-frequency-measurement-period allocator 16 designates a block within the MGRP that should be initially subjected to the search. Any block may be subjected to the first search. In the example of FIG. 13, let us assume that a block specified by subframe numbers 33, 34, 35, 36, 37, and 38 is specified. By selecting the beginning subframe number 33, the inter-frequency-measurement-period allocator 16 designates the block (subframe numbers 33, 34, 35, 36, 37, and 38) as the first search object.

In the first search, if any one of the numbers ASNs, BSNs, and CSNs is not included in the block, the inter-frequency-measurement-period allocator 16 selects the block as the measurement gap. More specifically, the inter-frequency-measurement-period allocator 16 selects the beginning subframe number 33 of the block as the gap offset. Thus, it is possible to select the measurement gap and to allocate it to the mobile station 20 while avoiding overlapping of the measurement gap with system information subframes, paging subframes, and on-duration subframes.

In the first search, if any one of the numbers ASNs, BSNs, and CSNs is included in the block, the inter-frequency-measurement-period allocator 16 designates a next block, i.e., the second search object. The next block is a block (subframe numbers 27, 28, 29, 30, 30, 31, and 32) shifted from the block (subframe numbers 33, 34, 35, 36, 37, and 38) searched last by one block. By selecting the beginning subframe number 27 that is the beginning subframe number 33 of the last searched block minus six, the inter-frequency-measurement-period allocator 16 designates the block (subframe numbers 27, 28, 29, 30, 30, 31, and 32) as the new search object.

In the second search, if any one of the numbers ASNs, BSNs, and CSNs is not included in the block, the inter-frequency-measurement-period allocator 16 selects the block as the measurement gap. More specifically, the inter-frequency-measurement-period allocator 16 selects the beginning subframe number 27 of the block as the gap offset.

In the second search, if any one of the numbers ASNs, BSNs, and CSNs is included in the block, the inter-frequency-measurement-period allocator 16 designates a next block, i.e., the third search object. The next block is a block (subframe numbers 21, 22, 23, 24, 25, and 26) shifted from the block (subframe numbers 27, 28, 29, 30, 30, 31, and 32) searched last by one block. By selecting the beginning subframe number 21 that is the beginning subframe number 27 of the last searched block minus six, the inter-frequency-measurement-period allocator 16 designates the block (subframe numbers 21, 22, 23, 24, 25, and 26) as the new search object.

In the third search, if any one of the numbers ASNs, BSNs, and CSNs is not included in the block, the inter-frequency-measurement-period allocator 16 selects the block as the measurement gap. More specifically, the inter-frequency-measurement-period allocator 16 selects the beginning subframe number 21 of the block as the gap offset.

In the third search, if any one of the numbers ASNs, BSNs, and CSNs is included in the block, the inter-frequency-measurement-period allocator 16 designates a next block, i.e., the fourth search object. The next block is a block (subframe numbers 15, 16, 17, 18, 19, and 20) shifted from the block (subframe numbers 21, 22, 23, 24, 25, and 26) searched last by one block. By selecting the beginning subframe number 15 that is the beginning subframe number 21 of the last searched block minus six, the inter-frequency-measurement-period allocator 16 designates the block (subframe numbers 15, 16, 17, 18, 19, and 20) as the new search object.

In the fourth search, if any one of the numbers ASNs, BSNs, and CSNs is not included in the block, the inter-frequency-measurement-period allocator 16 selects the block as the measurement gap. More specifically, the inter-frequency-measurement-period allocator 16 selects the beginning subframe number 15 of the block as the gap offset. Thus, if a block that does not include any one of the numbers ASNs, BSNs, and CSNs is found, the block is selected as the measurement gap. Otherwise, shift to a next block that is different from the last searched block by the length of one block is repeated.

In the sixth search for the block (subframe numbers 3, 4, 5, 6, 7, and 8) in which the beginning subframe number is less than 6, if any one of the numbers ASNs, BSNs, and CSNs is included in the block, the inter-frequency-measurement-period allocator 16 designates a next block, i.e., the seventh search object. In this case, the next block is a block (subframe numbers 37, 38, 39, 40, 1, and 2) shifted from the last searched block (subframe numbers 3, 4, 5, 6, 7, and 8) by the length of the block in a manner similar to the preceding search.

The block (subframe numbers 37, 38, 39, 40, 1, and 2) that is the seventh search object partially overlaps with the block (subframe numbers 33, 34, 35, 36, 37, and 38) that is the first search object. However, even through the block of the first search object does not include any one of the numbers ASNs, BSNs, and CSNs, it is not so limited that the block of the seventh search object does not include any one of the numbers ASNs, BSNs, and CSNs, so that the seventh search is conducted.

Afterward, if a block that does not include any one of the numbers ASNs, BSNs, and CSNs is found, the block is selected as the measurement gap. Otherwise, shift to a next block that is different from the last searched block by the length of one block is repeated. The eighth to the thirteenth search objects are different from the first to the sixth search objects by two subframes, respectively. The fourteenth to the twentieth search objects are different from the seventh to the thirteenth search objects by two subframes, respectively.

In the twentieth search, if any one of the numbers ASNs, BSNs, and CSNs is included in the block, the inter-frequency-measurement-period allocator 16 designates a next block, i.e., the twenty-first search object. The next block is a block (subframe numbers 32, 33, 34, 35, 36, and 37) shifted from the block (subframe numbers 39, 40, 1, 2, 3, and 4) searched last by seven subframes (not by the length of the block). This is because shifting by the length of the block results in designating the next block of subframe numbers 33, 34, 35, 36, 37, and 38, which was already searched in the first search.

Afterward, if a block that does not include any one of the numbers ASNs, BSNs, and CSNs is found, the block is selected as the measurement gap. Otherwise, shift to a next block that is different from the last searched block by the length of one block is repeated. As shown in FIGS. 13 and 14, the twenty-first to the twenty-seventh search objects are different from the fourteenth to the twentieth search objects by three subframes, respectively. The twenty-eighth to the thirty-fourth search objects are different from the twenty-first to the twenty-seventh search objects by two subframes, respectively. The thirty-fifth to the fortieth search objects are different from the twenty-eighth to the thirty-third search objects by two subframes, respectively. At most 40 searches can be conducted, in which 40 is the number of subframes included in the MGRP.

In the third embodiment described with reference to FIGS. 13 and 14, in each decision, the inter-frequency-measurement-period allocator 16 decides whether or not any one of the subframe numbers ASNs, BSNs, and CSNs to be avoided is included in a block that has the length of the measurement gaps and is constituted of multiple consecutive subframes. If any one of the subframe numbers ASNs, BSNs, and CSNs to be avoided is not included in the block, the inter-frequency-measurement-period allocator 16 selects the block as the measurement gap and allocates the measurement gap to the mobile station. If any one of the subframe numbers ASNs, BSNs, and CSNs to be avoided is included in the block, the inter-frequency-measurement-period allocator 16 designates a next block shifted from the block by the length of six subframes (the length of the block, i.e., the length of the measurement gap) or the length of seven subframes, and decides whether or not any one of the subframe numbers ASNs, BSNs, and CSNs to be avoided is included in the next block. In other words, in the third embodiment described with reference to FIGS. 13 and 14, if a block includes any one of the subframe numbers ASNs, BSNs, and CSNs to be avoided, the inter-frequency-measurement-period allocator 16 designates a next block shifted from the block by the length of multiple subframes, and decides whether or not any one of the subframe numbers ASNs, BSNs, and CSNs to be avoided is included in the next block. Therefore, convergence of measurement gaps allocated to multiple mobile stations 20 can be reduced.

Other Embodiments for Allocating Inter-Frequency Measurement Periods

The method for allocating measurement gaps is not limited to the above-described embodiments. In summary, it is preferable that a search be conducted in blocks different from those already searched, and the maximum number of times of search be the number of subframes included in the MGRP. It is more preferable to designate a next block shifted by the length of multiple subframes if the search object block includes any one of the subframe numbers ASNs, BSNs, and CSNs to be avoided.

Figure 15:
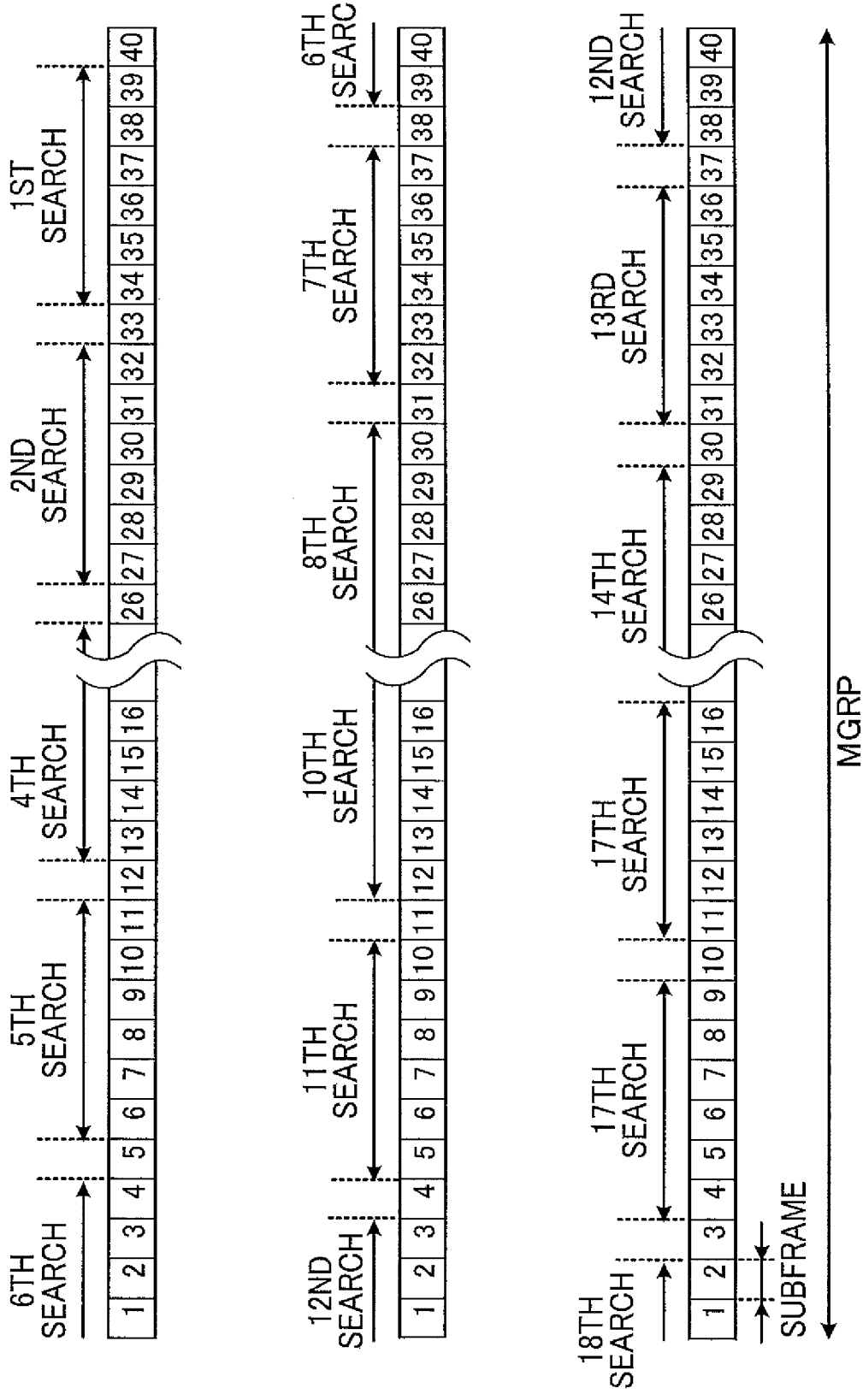
FIG. 15 is a diagram showing another example of a method for allocating inter-frequency measurement periods (measurement gaps) in the radio base station.

For example, as shown in FIG. 15, it is possible to designate a next block shifted by the length of seven subframes if the search object block includes any one of the subframe numbers ASNs, BSNs, and CSNs to be avoided.

As shown in FIG. 16, if the search object block includes any one of the subframe numbers ASNs, BSNs, and CSNs to be avoided, it is possible to designate a next block shifted by the length of five subframes as a general rule. In FIG. 16, exceptionally, the block of the eighth search object is different from the block of the ninth search object by six subframes. This is because if the general rule of shifting by the length of five subframes is complied with, the block of the ninth search object coincides with the block of the first search object, and it is necessary to avoid this situation. In FIG. 16, exceptionally, the block of the sixteenth search object is different from the block of the seventeenth search object by six subframes. This is because if the general rule of shifting by the length of five subframes is complied with, the block of the sixteenth search object coincides with the block of the ninth search object, and it is necessary to avoid this situation.

In the above-described embodiments shown in the accompanying drawings, the direction to shift to the next block is the direction of decrease in the subframe number. However, the direction to shift may be the opposite. Although not illustrated, if the search object block includes any one of the subframe numbers ASNs, BSNs, and CSNs to be avoided, the next block may be selected at random from among blocks that have not been searched.

Other Variations

In the above-described embodiments, the subframe determiner 14 determines all of system information subframes, paging subframes, and on-duration subframes, and the inter-frequency-measurement-period allocator 16 selects measurement gaps and allocates the measurement gaps to the mobile station with avoiding overlapping of measurement gaps with the determined subframes. However, the subframe determiner 14 may determine at least any one type of subframes constituted of system information subframes, paging subframes, or on-duration subframes. The inter-frequency-measurement-period allocator 16 may select measurement gaps and may allocate the measurement gaps to the mobile station while avoiding overlapping of measurement gaps with the subframes determined by the subframe determiner 14. According to this variation, it is possible to avoid at least one of simultaneous occurrence of periods of transmission of the system information and the inter-frequency measurement periods for inter-frequency measurement at the mobile station 20, simultaneous occurrence of paging occasions in idle mode of the mobile station 20 and the inter-frequency measurement periods, and simultaneous occurrence of on-durations in discontinuous reception for the downlink control channel at the mobile station 20 and the inter-frequency measurement periods.

In the above-described embodiments, system information subframes to be avoided are subframes for which the base station sends SI messages, but system information subframes to be avoided may be subframes for which the base station sends SIB-1 or MIB.

In the above-described embodiments, on-duration subframes to be avoided are subframes corresponding to on-durations adapted for Long DRX, but on-duration subframes to be avoided may be subframes corresponding to on-durations adapted for Short DRX.

In allocation of inter-frequency measurement periods, the inter-frequency-measurement-period allocator 16 may designate the initial block that is initially used for searching, in such a manner that the initial block varies depending on the mobile station 20 to which the measurement gaps are allocated. For example, the block that is initially searched for allocation of inter-frequency measurement periods to a mobile station 20 may be recorded, and in allocation of inter-frequency measurement periods to another mobile station 20, the first search may be conducted in a block shifted from the block by the length of a predetermined number of subframes. Alternatively, the initial block that is initially used for searching may be determined at random. If the search always begins with the same initial block, there is a likelihood that measurement gaps allocated to a mobile station 20 coincide with or partially overlap with those allocated to another mobile station 20. Since resources available for downlink transmission at a ratio base station are finite, simultaneous occurrence of measurement gaps for which the serving base station does not send data to mobile stations 20 is not preferable. In other words, it is preferable that periods available for sending data to a mobile station 20 are far away from periods available for sending data to another mobile station 20. For example, in the LTE system, if periods available for sending data to a mobile station 20 are far away from periods available for sending data to another mobile station 20, there are fewer restrictions on scheduling that involves allocation of subcarriers to mobile stations 20. By varying the initial block that is initially used for search depending on the mobile station 20, convergence of measurement gaps allocated to multiple mobile stations 20 can be reduced.

The above-described embodiments are adapted for an LTE system. However, use of the present invention is not limited to LTE systems. For example, the present invention may also be used in radio base stations in 3G systems, WiFi, Wimax, or other wireless systems.

In the base station 20, functions executed by the CPU may be executed by hardware or a programmable logic device, such as an FPGA (Field Programmable Gate Array) or a DSP (Digital Signal Processor), instead of the CPU.

REFERENCE SYMBOLS

10: Radio Base Station
12: Transceiver
14: Subframe Determiner
16: Inter-frequency-measurement-period Allocator
20: Mobile Station

The invention claimed is:

1. A radio base station comprising:
a subframe determiner adapted for determining at least any one type of subframes constituted of multiple system information subframes at which the base station sends system information to a mobile station, multiple paging subframes at which the mobile station receives paging messages in idle mode, or multiple on-duration subframes corresponding to on-durations at which the mobile station receives downlink control channel signals in discontinuous reception mode for the downlink control channel signals; and
an inter-frequency-measurement-period allocator adapted for allocating, to the mobile station, inter-frequency measurement periods for inter-frequency measurement at the mobile station, in such a manner that the inter-frequency-measurement-period allocator avoids simultaneous occurrence of inter-frequency measurement periods and the subframes determined by the subframe determiner,
wherein the subframe determiner is adapted for determining, as subframe numbers to be avoided, at least any one type of numbers constituted of relative numbers of the multiple system information subframes with respect to a length of a repetition cycle of the inter-frequency measurement periods, relative numbers of the multiple paging subframes with respect to the length of a repetition cycle of the inter-frequency measurement periods, and relative numbers of the multiple on-duration subframes with respect to the length of a repetition cycle of the inter-frequency measurement periods,
wherein the inter-frequency-measurement-period allocator is adapted for deciding whether or not any one of the subframe numbers to be avoided is included in a block having a length of the inter-frequency measurement periods, constituted of multiple consecutive subframes, and specified by subframe numbers with respect to the length of the repetition cycle of the inter-frequency measurement periods, and
wherein the inter-frequency-measurement-period allocator is adapted for selecting the block as the inter-frequency measurement period if any one of the subframe numbers to be avoided is not included in the block, and for repeating the decision to a next block shifted from the block by one subframe if any one of the subframe numbers to be avoided is included in the block.

2. The radio base station according to claim 1, wherein the inter-frequency-measurement-period allocator is adapted for designating an initial block that is initially used for deciding whether or not any one of the subframe numbers to be avoided is included, in such a manner that the initial block varies depending on the mobile station to which the inter-frequency measurement periods are allocated.

3. The radio base station according to claim 1, wherein the subframe determiner is adapted for determining all of the multiple system information subframes, the multiple paging subframes, and the multiple on-duration subframes.

4. A radio base station comprising:
a subframe determiner adapted for determining at least any one type of subframes constituted of multiple system information subframes at which the base station sends system information to a mobile station, multiple paging subframes at which the mobile station receives paging messages in idle mode, or multiple on-duration subframes corresponding to on-durations at which the mobile station receives downlink control channel signals in discontinuous reception mode for the downlink control channel signals; and an inter-frequency-measurement-period allocator adapted for allocating, to the mobile station, inter-frequency measurement periods for inter-frequency measurement at the mobile station, in such a manner that the inter-frequency-measurement-period allocator avoids simultaneous occurrence of inter-frequency measurement periods and the subframes determined by the subframe determiner, wherein the subframe determiner is adapted for determining, as subframe numbers to be avoided, at least any one type of numbers constituted of relative numbers of the multiple system information subframes with respect to a length of a repetition cycle of the inter-frequency measurement periods, relative numbers of the multiple paging subframes with respect to the length of a repetition cycle of the inter-frequency measurement periods, and relative numbers of the multiple on-duration subframes with respect to the length of a repetition cycle of the inter-frequency measurement periods, wherein the inter-frequency-measurement-period allocator is adapted for deciding whether or not any one of the subframe numbers to be avoided is included in a block having a length of the inter-frequency measurement periods, constituted of multiple consecutive subframes, and specified by subframe numbers with respect to the length of the repetition cycle of the inter-frequency measurement periods, and wherein the inter-frequency-measurement-period allocator is adapted for selecting the block as the inter-frequency measurement period if any one of the subframe numbers to be avoided is not included in the block, and for repeating the decision to a next block shifted from the block by multiple subframes if any one of the subframe numbers to be avoided is included in the block.

5. The radio base station according to claim 4, wherein the inter-frequency-measurement-period allocator is adapted for designating an initial block that is initially used for deciding whether or not any one of the subframe numbers to be avoided is included, in such a manner that the initial block varies depending on the mobile station to which the inter-frequency measurement periods are allocated.

6. The radio base station according to claim 4, wherein the subframe determiner is adapted for determining all of the multiple system information subframes, the multiple paging subframes, and the multiple on-duration subframes.

* * * * *